United States Patent
Alvarez et al.

(10) Patent No.: US 11,815,908 B2
(45) Date of Patent: Nov. 14, 2023

(54) ENHANCED OPERATIONAL DOMAIN MONITORING AND VISUALIZATION SYSTEMS AND METHODS

(71) Applicant: Mobileye Vision Technologies Ltd., Har Hotzvim (IL)

(72) Inventors: Ignacio J. Alvarez, Portland, OR (US); Yang Liu, Pasadena, CA (US); Fabricio Novak, Santa Clara, CA (US)

(73) Assignee: Mobileye Vision Technologies Ltd., Jerusalem (IL)

( * ) Notice: Subject to any disclaimer, the term of this patent is extended or adjusted under 35 U.S.C. 154(b) by 412 days.

(21) Appl. No.: 16/832,899

(22) Filed: Mar. 27, 2020

(65) Prior Publication Data
US 2020/0225683 A1   Jul. 16, 2020

(51) Int. Cl.
G05D 1/02 (2020.01)
B60W 60/00 (2020.01)
G07C 5/00 (2006.01)

(52) U.S. Cl.
CPC ....... G05D 1/0285 (2013.01); B60W 60/0016 (2020.02); B60W 60/0054 (2020.02); B60W 60/00186 (2020.02); G07C 5/008 (2013.01)

(58) Field of Classification Search
CPC ............ G05D 1/0285; B60W 60/0016; B60W 60/0054; B60W 60/00186; G07C 5/008
See application file for complete search history.

(56) References Cited

U.S. PATENT DOCUMENTS

| | | | | |
|---|---|---|---|---|
| 2008/0184371 | A1* | 7/2008 | Moskovitch | G06F 21/566 706/12 |
| 2015/0066447 | A1* | 3/2015 | Lin | G06F 30/20 703/2 |
| 2020/0262366 | A1* | 8/2020 | Wildgrube | G05D 17/02 |
| 2021/0390420 | A1* | 12/2021 | Barnett | G06N 5/02 |

OTHER PUBLICATIONS

English Translation of DE102007010978A1 Author: Krieger et al. Title: Electrical System's Diagnosis Supporting Device for Use in Motor Vehicle, Has Evaluation Unit to Produce List of Incorrect Components That are Sorted Based on Dependence Value, and Output/supply Unit to Display or Provide List (Year: 2008) Date: Sep. 11, 2008 (Year: 2008).*

English Translation of CN109657797A Author: Lian et al. Title: fault diagnosis capability analysis method based on a hybrid diagnosis Bayesian network Date: Apr. 19, 2019 (Year: 2019).*

(Continued)

*Primary Examiner* — James J Lee
*Assistant Examiner* — Steven Vu Nguyen
(74) *Attorney, Agent, or Firm* — Banner & Witcoff Ltd.

(57) ABSTRACT

In an automated vehicle (AV) system, interdependencies between components of the AV are determined, an operational domain state of one or more of the components can be determined based on the determined interdependencies, and an output signal representing the operational domain state of the one or more components can be generated. A user interface can present a notification based on the output signal to notify the driver and/or other occupants of the AV of the operational domain state of one or more of the components.

22 Claims, 12 Drawing Sheets

(56) References Cited

OTHER PUBLICATIONS

Chen, Dejiu et al: "A Model-Based Approach to Dynamic Self-Assessment for Automated Performance and Safety Awareness of Cyber-Physical Systems", Aug. 2, 2017, ICIAP: International Conference on Image Analysis and Processing, 17th International Conference, Naples, Italy, Sep. 9-13, 2013. Proceedings; [Lecture Notes in Computer Science; Lect.Notes Computer], Springer, Berlin, Heidelberg, pp. 227-2, XP047425385, ISBN: 978-3-642-17318-9.
Debernard S. et al: "Designing Human-Machine Interface for Autonomous Vehicles", IFAC—PapersOnline, vol. 49, No. 19, Jan. 1, 2016, pp. 609-614, XP05580697 4, DE.
European Search Report dated Jun. 9, 2021 for European Patent Application No. 20213186.8.
Colwell, I. (2018). Runtime Restriction of the Operational Design Domain: A Safety Concept for Automated Vehicles. Waterloo, Ontario, Canada: University of Waterloo.
Koopman, P., & Fratrik, F. (2019). How Many Operational Design Domains, Objects, and Events? SafeAI. AAAI.
NHTSA. (Sep. 2017). Automated Driving Systems: A Vision for Safety. US DOT.
Orlove, R. (Jun. 13, 2018). This Test Shows Why Tesla Autopilot Crashes Keep Happening. Retrieved from jalopnik: https://jalopnik.com/this-test-shows-why-tesla-autopilot-crashes-keep-happen-1826810902.
New York Times, (2016) Joshua Brown, Who Died in Self-Driving Accident, Tested Limits of His Tesla, online article retrieved from https://www.nytimes.com/2016/07/02/business/joshua-brown-technology-enthusiast-tested-the-limits-of-his-tesla.html.
Autoware.ai (2019) retrieved online from https://www.autoware.ai/.

\* cited by examiner

ENHANCED OPERATIONAL DOMAIN MONITORING AND VISUALIZATION SYSTEMS AND METHODS

TECHNICAL FIELD

Various aspects of this disclosure generally relate to autonomous driving systems.

BACKGROUND

Autonomous driving utilizes reliable driving control and safety systems that process data acquired at a vehicle. Using data acquired at the vehicle, which may include data about the vehicle's environment or data about the vehicle itself, the vehicle may alter its movements, modify its positioning with respect to external elements, and/or respond to newly detected events. Additionally, autonomous vehicles may be configured to communicate with other devices, such as other vehicles, network infrastructure elements, wireless devices, etc., to assist in the mobility control, provide faster information processing, and, generally speaking, communicate information in order to improve overall system performance.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

Figure 1:
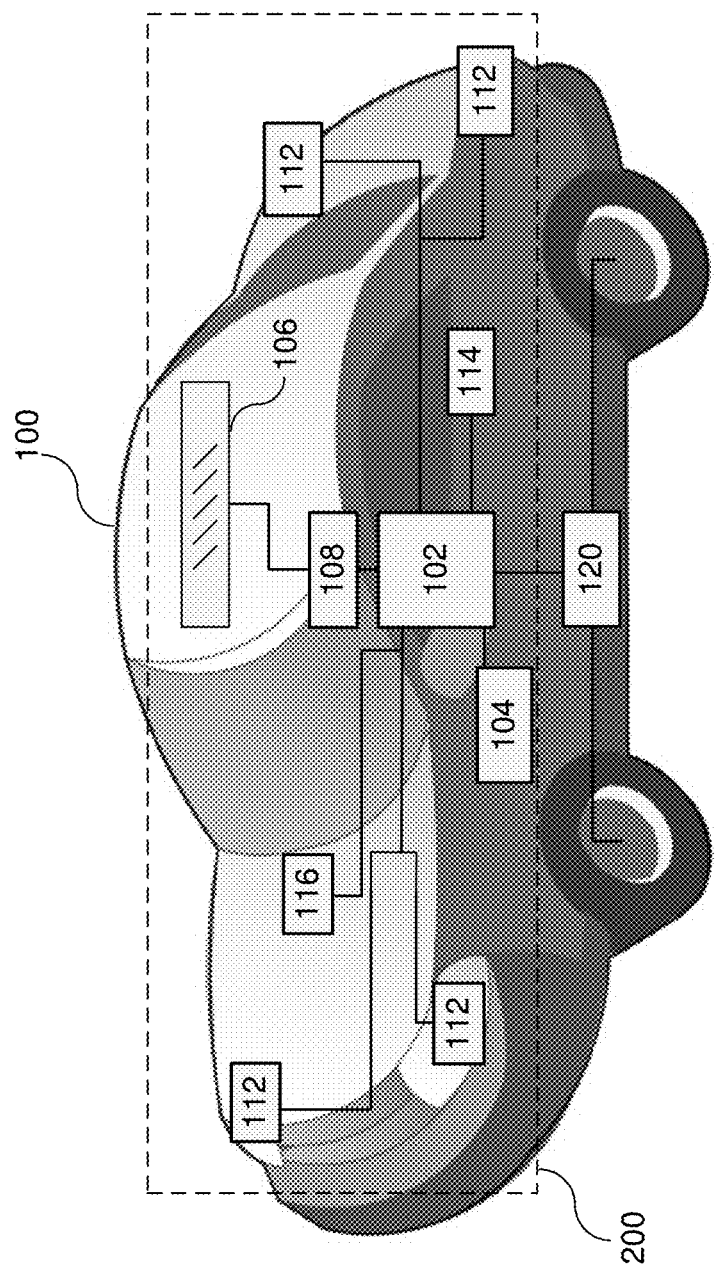
FIG. 1 shows an exemplary autonomous vehicle in accordance with various aspects of the present disclosure.

The exemplary aspects of the present disclosure will be described with reference to the accompanying drawings.

The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Conventional vehicle automation user interfaces limit or prevent drivers (and/or other vehicle occupants) from understanding capabilities and limitations of the automated vehicle and its current operation and operational states. Aspects of the present disclosure advantageously provide the occupants of the vehicle with detailed information of the predefined operational envelope and/or Operational Design Domain (ODD). With this detailed information, the aspects of the disclosure advantageously reduce or eliminate over-trust and/or under-trust on the autonomous vehicle's operation and operational states by the driver (and/or other occupants of the vehicle). In an over-trust situation, the system appears to the user to be working properly (automation is on), but is in fact working outside the ODD (e.g. autonomously driving but the automation is impaired). In an under-trust situation, the driver (and/or other occupants of the vehicle) does not have confidence in the autonomous vehicle's ability to handle one or more external conditions perceived by the driver/occupants.

FIG. 1 shows a vehicle 100 including a mobility system 120 and a control system 200 (see also FIG. 2) in accordance with various aspects. The control system 200 is communicatively coupled via one or more wired and/or wireless connections. It is appreciated that vehicle 100 and control system 200 are exemplary in nature and may thus be simplified for explanatory purposes. For example, while vehicle 100 is depicted as a ground vehicle, aspects of this disclosure may be equally or analogously applied to aerial vehicles such as drones or aquatic vehicles such as boats. Furthermore, the quantities and locations of elements, as well as relational distances are provided as examples and are not limited thereto. The components of vehicle 100 may be arranged around a vehicular housing of vehicle 100, mounted on or outside of the vehicular housing, enclosed within the vehicular housing, or any other arrangement relative to the vehicular housing where the components move with vehicle 100 as it travels. The vehicular housing, such as an automobile body, drone body, plane or helicopter fuselage, boat hull, or similar type of vehicular body dependent on the vehicle type of vehicle 100.

In addition to including a control system 200, vehicle 100 may also include a mobility system 120. Mobility system 120 may include components of vehicle 100 related to steering and movement of vehicle 100. In some aspects, where vehicle 100 is an automobile, for example, mobility system 120 may include wheels and axles, a suspension, an engine, a transmission, brakes, a steering wheel, associated electrical circuitry and wiring, and any other components used in the driving of an automobile. In some aspects, where vehicle 100 is an aerial vehicle, mobility system 120 may include one or more of rotors, propellers, jet engines, wings, rudders or wing flaps, air brakes, a yoke or cyclic, associated electrical circuitry and wiring, and any other components used in the flying of an aerial vehicle. In some aspects, where vehicle 100 is an aquatic or sub-aquatic vehicle, mobility system 120 may include any one or more of rudders, engines, propellers, a steering wheel, associated electrical circuitry and wiring, and any other components used in the steering or movement of an aquatic vehicle. In some aspects, mobility system 120 may also include autonomous driving functionality, and accordingly may include an interface with one or more processors 102 configured to perform autonomous driving computations and decisions, and an array of sensors for movement and obstacle sensing. In this aspect, the mobility system 120 may be provided with instructions to direct the navigation and/or mobility of vehicle 100 from one or more components of the control system 200. The autonomous driving components of mobility system 120 may also interface with one or more radio frequency (RF) transceivers 108 to facilitate mobility coordination with other nearby vehicular communication devices and/or central networking components that perform decisions and/or computations related to autonomous driving.

Figure 2:
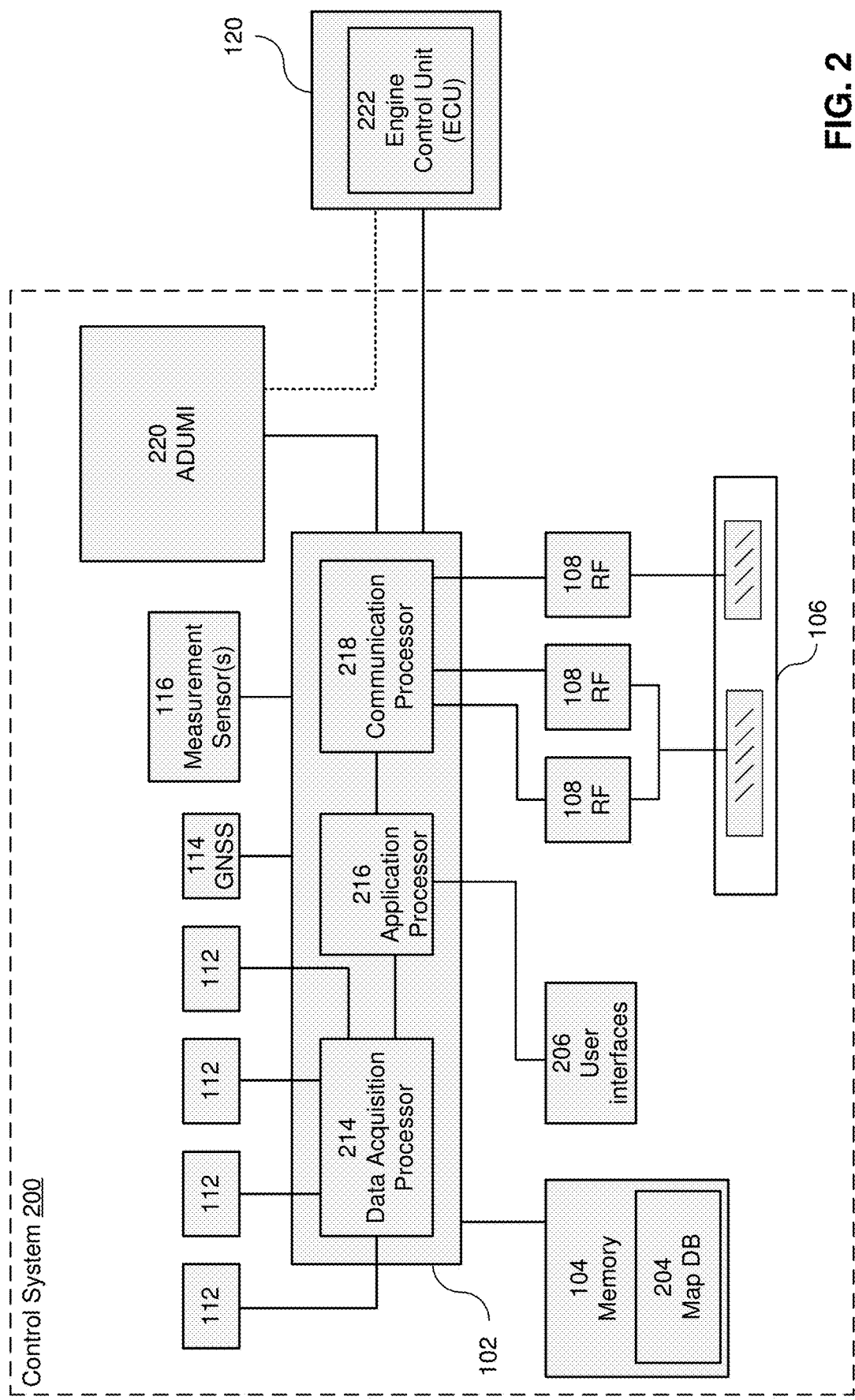
FIG. 2 shows various exemplary electronic components of a control system of the vehicle in accordance with various aspects of the present disclosure.

The control system 200 may include various components depending on the requirements of a particular implementation. As shown in FIG. 1 and FIG. 2, the control system 200 may include one or more processors 102, one or more memories 104, an antenna system 106 which may include one or more antenna arrays at different locations on the vehicle for radio frequency (RF) coverage, one or more radio frequency (RF) transceivers 108, one or more data acquisition devices 112, one or more position devices 114 which may include components and circuitry for receiving and determining a position based on a Global Navigation Satellite System (GNSS) and/or a Global Positioning System (GPS), and one or more measurement sensors 116, e.g. speedometer, altimeter, gyroscope, velocity sensors, etc.

The control system 200 may be configured to control the vehicle's 100 mobility via mobility system 120 and/or interactions with its environment, e.g. communications with other devices or network infrastructure elements (NIEs) such as base stations, via data acquisition devices 112 and the radio frequency communication arrangement including the one or more RF transceivers 108 and antenna system 106. In one or more aspects, a NIE may be a base station (e.g. an eNodeB, a gNodeB, etc.), a road side unit (RSU), a road sign configured to wirelessly communicate with vehicles and/or a mobile radio communication network, etc., and serve as an interface between one or more of vehicles 100 and a mobile radio communications network, e.g., an LTE network or a 5G network.

The one or more processors 102 may include a data acquisition processor 214, an application processor 216, a communication processor 218, and/or any other suitable processing device. As shown in the exemplary aspects, illustrated in FIG. 3, the one or more processors 102 may further include Autonomous Driving User Machine Interface (ADUMI) 220, discussion of which is provided in more detail below. Each processor 214, 216, 218 and/or the ADUMI 220 of the one or more processors 102 may include various types of hardware-based processing devices. By way of example, each processor 214, 216, 218 and/or the ADUMI 220 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 214, 216, 218 and/or the ADUMI 220 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 and/or the ADUMI 220 disclosed herein may be configured to perform certain functions in accordance with program instructions which may be stored in a memory of the one or more memories 104. In other words, a memory of the one or more memories 104 may store software that, when executed by a processor (e.g., by the one or more processors 102), controls the operation of the system, e.g., a driving and/or safety system. A memory of the one or more memories 104 may store one or more databases and image processing software, as well as a trained system, such as a neural network, or a deep neural network, for example. The one or more memories 104 may include any number of random-access memories, read only memories, flash memories, disk drives, optical storage, tape storage, removable storage and other types of storage. Alternatively, each of processors 214, 216, 218 and/or the ADUMI 220 may include an internal memory for such storage.

The data acquisition processor 216 may include processing circuitry, such as a CPU, for processing data acquired by data acquisition devices 112. For example, if one or more data acquisition devices 112 are image acquisition units, e.g. one or more cameras, then the data acquisition processor may include image processors for processing image data using the information obtained from the image acquisition units as an input. The data acquisition processor 216 may therefore be configured to create voxel maps detailing the surrounding of the vehicle 100 based on the data input from the data acquisition devices 112, i.e., cameras in this example.

Application processor 216 may be a CPU, and may be configured to handle the layers above the protocol stack, including the transport and application layers. Application processor 216 may be configured to execute various applications and/or programs of vehicle 100 at an application layer of vehicle 100, such as an operating system (OS), a user interfaces (UI) 206 for supporting user interaction with vehicle 100, and/or various user applications. Application processor 216 may interface with communication processor 218 and act as a source (in the transmit path) and a sink (in the receive path) for user data, such as voice data, audio/video/image data, messaging data, application data, basic Internet/web access data, etc. In the transmit path, communication processor 218 may therefore receive and process outgoing data provided by application processor 216 according to the layer-specific functions of the protocol stack, and provide the resulting data to digital signal processor 208. Communication processor 218 may then perform physical layer processing on the received data to produce digital baseband samples, which digital signal processor may provide to RF transceiver(s) 108. RF transceiver(s) 108 may then process the digital baseband samples to convert the digital baseband samples to analog RF signals, which RF transceiver(s) 108 may wirelessly transmit via antenna system 106. In the receive path, RF transceiver(s) 108 may receive analog RF signals from antenna system 106 and process the analog RF signals to obtain digital baseband samples. RF transceiver(s) 108 may provide the digital baseband samples to communication processor 218, which may perform physical layer processing on the digital baseband samples. Communication processor 218 may then provide the resulting data to other processors of the one or more processors 102, which may process the resulting data according to the layer-specific functions of the protocol stack and provide the resulting incoming data to application processor 216. Application processor 216 may then handle the incoming data at the application layer, which can include execution of one or more application programs with the data and/or presentation of the data to a user via one or more user interfaces 206. User interfaces 206 may include one or more screens, microphones, mice, touchpads, keyboards, or any other interface providing a mechanism for user input.

The communication processor 218 may include a digital signal processor and/or a controller which may direct such communication functionality of vehicle 100 according to the communication protocols associated with one or more radio access networks, and may execute control over antenna system 106 and RF transceiver(s) 108 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness, the configuration of vehicle 100 shown in FIGS. 1 and 2 may depict only a single instance of such components.

Vehicle 100 may transmit and receive wireless signals with antenna system 106, which may be a single antenna or an antenna array that includes multiple antenna elements. In some aspects, antenna system 202 may additionally include analog antenna combination and/or beamforming circuitry. In the receive (RX) path, RF transceiver(s) 108 may receive analog radio frequency signals from antenna system 106 and perform analog and digital RF front-end processing on the analog radio frequency signals to produce digital baseband samples (e.g., In-Phase/Quadrature (IQ) samples) to provide to communication processor 218. RF transceiver(s) 108 may include analog and digital reception components including amplifiers (e.g., Low Noise Amplifiers (LNAs)), filters, RF demodulators (e.g., RF IQ demodulators)), and analog-to-digital converters (ADCs), which RF transceiver(s) 108 may utilize to convert the received radio frequency signals to digital baseband samples. In the transmit (TX) path, RF transceiver(s) 108 may receive digital baseband samples from communication processor 218 and perform analog and digital RF front-end processing on the digital baseband samples to produce analog radio frequency signals to provide to antenna system 106 for wireless transmission. RF transceiver(s) 108 may thus include analog and digital transmission components including amplifiers (e.g., Power Amplifiers (PAs), filters, RF modulators (e.g., RF IQ modulators), and digital-to-analog converters (DACs), which RF transceiver(s) 108 may utilize to mix the digital baseband samples received from communication processor 218 and produce the analog radio frequency signals for wireless transmission by antenna system 106. In some aspects, communication processor 218 may control the radio transmission and reception of RF transceiver(s) 108, including specifying transmit and receive radio frequencies for operation of RF transceiver(s) 108.

According to some aspects, communication processor 218 includes a baseband modem configured to perform physical layer (PHY, Layer 1) transmission and reception processing to, in the transmit path, prepare outgoing transmit data provided by communication processor 218 for transmission via RF transceiver(s) 108, and, in the receive path, prepare incoming received data provided by RF transceiver(s) 108 for processing by communication processor 218. The baseband modem may include a digital signal processor and/or a controller. The digital signal processor may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. The digital signal processor may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, the digital signal processor may include one or more processors configured to retrieve and execute program code that defines control and processing logic for physical layer processing operations. In some aspects, the digital signal processor may execute processing functions with software via the execution of executable instructions. In some aspects, the digital signal processor may include one or more dedicated hardware circuits (e.g., ASICs, FPGAs, and other hardware) that are digitally configured to specific execute processing functions, where the one or more processors of digital signal processor may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of the digital signal processor may be realized as a coupled integrated circuit.

Vehicle 100 may be configured to operate according to one or more radio communication technologies. The digital signal processor of the communication processor 218 may be responsible for lower-layer processing functions (e.g., Layer 1/PHY) of the radio communication technologies, while a controller of the communication processor 218 may be responsible for upper-layer protocol stack functions (e.g., Data Link Layer/Layer 2 and/or Network Layer/Layer 3). The controller may thus be responsible for controlling the radio communication components of vehicle 100 (antenna system 106, RF transceiver(s) 108, position device 114, etc.) in accordance with the communication protocols of each supported radio communication technology, and accordingly may represent the Access Stratum and Non-Access Stratum (NAS) (also encompassing Layer 2 and Layer 3) of each supported radio communication technology. The controller may be structurally embodied as a protocol processor configured to execute protocol stack software (retrieved from a controller memory) and subsequently control the radio communication components of vehicle 100 to transmit and receive communication signals in accordance with the corresponding protocol stack control logic defined in the protocol stack software. The controller may include one or more processors configured to retrieve and execute program code that defines the upper-layer protocol stack logic for one or more radio communication technologies, which can include Data Link Layer/Layer 2 and Network Layer/Layer 3 functions. The controller may be configured to perform both user-plane and control-plane functions to facilitate the transfer of application layer data to and from vehicle 100 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by the controller of communication processor 218 may include executable instructions that define the logic of such functions.

In some aspects, vehicle 100 may be configured to transmit and receive data according to multiple radio communication technologies. Accordingly, in some aspects one or more of antenna system 106, RF transceiver(s) 108, and communication processor 218 may include separate components or instances dedicated to different radio communication technologies and/or unified components that are shared between different radio communication technologies. For example, in some aspects, multiple controllers of communication processor 218 may be configured to execute multiple protocol stacks, each dedicated to a different radio communication technology and either at the same processor or different processors. In some aspects, multiple digital signal processors of communication processor 218 may include separate processors and/or hardware accelerators that are dedicated to different respective radio communication technologies, and/or one or more processors and/or hardware accelerators that are shared between multiple radio communication technologies. In some aspects, RF transceiver(s) 108 may include separate RF circuitry sections dedicated to different respective radio communication technologies, and/or RF circuitry sections shared between multiple radio communication technologies. In some aspects, antenna system 106 may include separate antennas dedicated to different respective radio communication technologies, and/or antennas shared between multiple radio communication technologies. Accordingly, antenna system 106, RF transceiver(s) 108, and communication processor 218 can encompass separate and/or shared components dedicated to multiple radio communication technologies.

Communication processor 218 may be configured to implement one or more vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols. Communication processor 218 may be configured to transmit communications including communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

Communication processor 218 may be configured to operate via a first RF transceiver of the one or more RF transceivers(s) 108 according to different desired radio communication protocols or standards. By way of example, communication processor 218 may be configured in accordance with a Short-Range mobile radio communication standard such as e.g. Bluetooth, Zigbee, and the like, and the first RF transceiver may correspond to the corresponding Short-Range mobile radio communication standard. As another example, communication processor 218 may be configured to operate via a second RF transceiver of the one or more RF transceivers(s) 108 in accordance with a Medium or Wide Range mobile radio communication standard such as, e.g., a 3G (e.g. Universal Mobile Telecommunications System—UMTS), a 4G (e.g. Long Term Evolution—LTE), or a 5G mobile radio communication standard in accordance with corresponding 3GPP ($3^{rd}$ Generation Partnership Project) standards. As a further example, communication processor 218 may be configured to operate via a third RF transceiver of the one or more RF transceivers(s) 108 in accordance with a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, and the like). The one or more RF transceiver(s) 108 may be configured to transmit signals via antenna system 106 over an air interface. The RF transceivers 108 may each have a corresponding antenna element of antenna system 106, or may share an antenna element of the antenna system 106.

Memory 214 may embody a memory component of vehicle 100, such as a hard drive or another such permanent memory device. Although not explicitly depicted in FIGS. 1 and 2, the various other components of vehicle 100, e.g. one or more processors 102, shown in FIGS. 1 and 2 may additionally each include integrated permanent and non-permanent memory components, such as for storing software program code, buffering data, etc.

The antenna system 106 may include a single antenna or multiple antennas. In some aspects, each of the one or more antennas of antenna system 106 may be placed at a plurality of locations on the vehicle 100 in order to ensure maximum RF coverage. The antennas may include a phased antenna array, a switch-beam antenna array with multiple antenna elements, etc. Antenna system 106 may be configured to operate according to analog and/or digital beamforming schemes in order to maximize signal gains and/or provide levels of information privacy. Antenna system 106 may include separate antennas dedicated to different respective radio communication technologies, and/or antennas shared between multiple radio communication technologies. While shown as a single element in FIG. 1, antenna system 106 may include a plurality of antenna elements (e.g., antenna arrays) positioned at different locations on vehicle 100. The placement of the plurality of antenna elements may be strategically chosen in order to ensure a desired degree of RF coverage. For example, additional antennas may be placed at the front, back, corner(s), and/or on the side(s) of the vehicle 100.

Data acquisition devices 112 may include any number of data acquisition devices 112 and components depending on the requirements of a particular application. This may include: image acquisition devices, proximity detectors, acoustic sensors, infrared sensors, piezoelectric sensors, etc., for providing data about the vehicle's environment. Image acquisition devices may include cameras (e.g., standard cameras, digital cameras, video cameras, single-lens reflex cameras, infrared cameras, stereo cameras, etc.), charge coupling devices (CCDs) or any type of image sensor. Proximity detectors may include radar sensors, light detection and ranging (LIDAR) sensors, mmWave radar sensors, etc. Acoustic sensors may include: microphones, sonar sensors, ultrasonic sensors, etc. Accordingly, each of the data acquisition devices 112 may be configured to observe a particular type of data of the vehicle's 100 environment and forward the data to the data acquisition processor 214 in order to provide the vehicle with an accurate portrayal of the vehicle's environment. The data acquisition devices 112 may be configured to implement pre-processed sensor data, such as radar target lists or LIDAR target lists, in conjunction with acquired data.

Measurement devices 116 may include other devices for measuring vehicle-state parameters, such as a velocity sensor (e.g., a speedometer) for measuring a velocity of the vehicle 100, one or more accelerometers (either single axis or multi-axis) for measuring accelerations of the vehicle 100 along one or more axes, a gyroscope for measuring orientation and/or angular velocity, odometers, altimeters, thermometers, etc. It is appreciated that vehicle 100 may have different measurement devices 116 depending on the type of vehicle it is, e.g., car vs. drone vs. boat.

Position devices 114 may include components for determining a position of the vehicle 100. For example, this may include global position system (GPS) or other global navigation satellite system (GNSS) circuitry configured to receive signals from a satellite system and determine a position of the vehicle 100. Position devices 114, accordingly, may provide vehicle 100 with satellite navigation features.

The one or more memories 104 may store data, e.g., in a database or in any different format, that may correspond to a map. For example, the map may indicate a location of known landmarks, roads, paths, network infrastructure elements, or other elements of the vehicle's 100 environment. The one or more processors 102 may process sensory information (such as images, radar signals, depth information from LIDAR, or stereo processing of two or more images) of the environment of the vehicle 100 together with position information, such as a GPS coordinate, a vehicle's ego-motion, etc., to determine a current location of the vehicle 100 relative to the known landmarks, and refine the determination of the vehicle's location. Certain aspects of this technology may be included in a localization technology such as a mapping and routing model.

The map database (DB) 204 may include any type of database storing (digital) map data for the vehicle 100, e.g., for the control system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In some aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

Furthermore, the control system 200 may include a driving model, e.g., implemented in an advanced driving assistance system (ADAS) and/or a driving assistance and automated driving system. By way of example, the control system 200 may include (e.g., as part of the driving model) a computer implementation of a formal model such as a safety driving model. A safety driving model may be or include a mathematical model formalizing an interpretation of applicable laws, standards, policies, etc. that are applicable to self-driving vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

Figure 3:
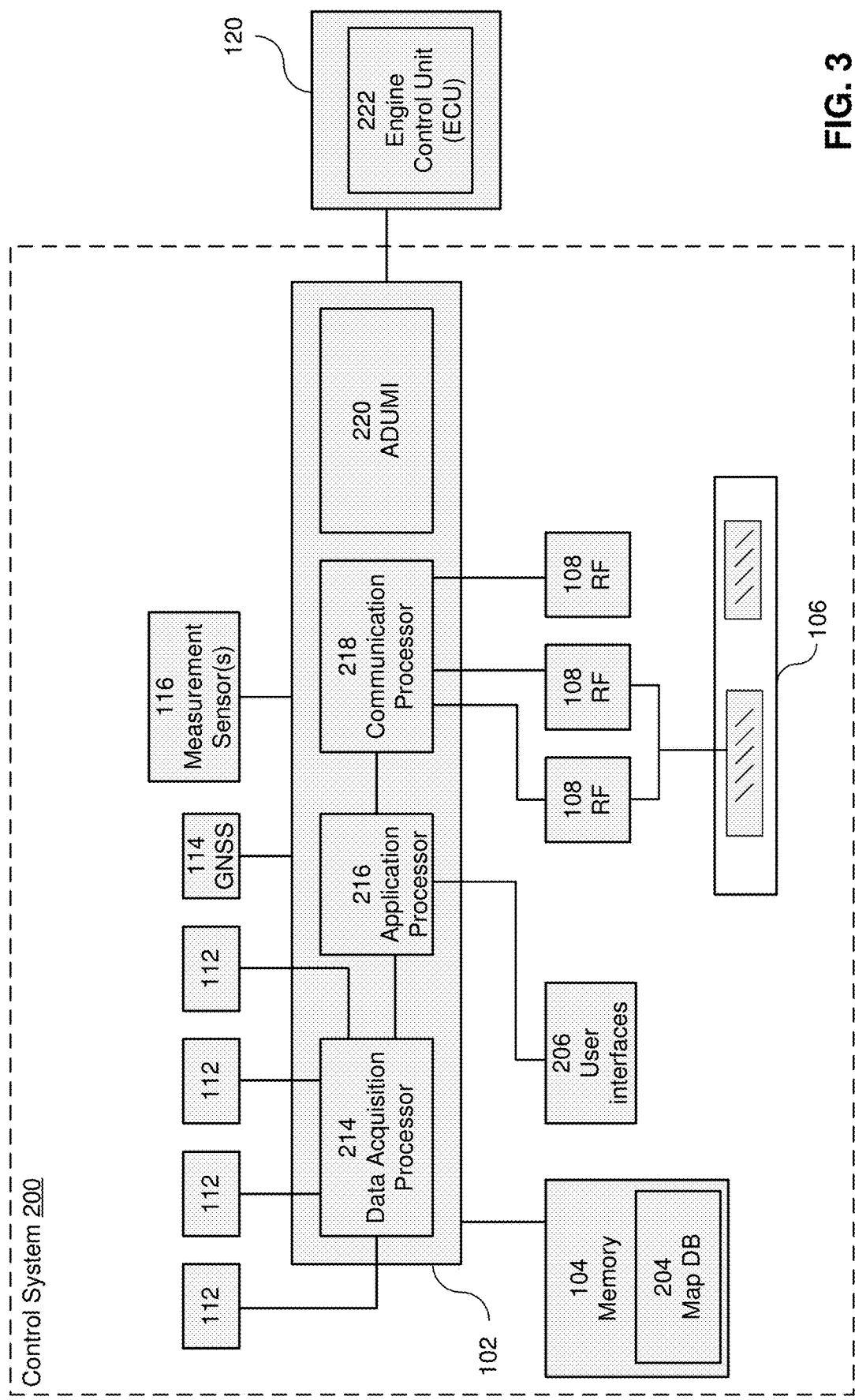
FIG. 3 shows various exemplary electronic components of a control system of the vehicle in accordance with various aspects of the present disclosure.

As described above, the vehicle 100 may include the control system 200 as also described with reference to FIG. 2. The vehicle 100 may include the one or more processors 102 integrated with or separate from an engine control unit (ECU) 222 which may be included in the mobility system 120 (as shown in FIGS. 2 and 3) of the vehicle 100. The control system 200 may, in general, generate data to control or assist control of the ECU 222 and/or other components of the vehicle 100 to directly or indirectly control the movement of the vehicle 100 via mobility system 120. The one or more processors 102 and/or the ODD 220 of the vehicle 100 may be configured to implement the aspects and methods described herein.

The components illustrated in FIGS. 1-3 may be operatively connected to one another via any appropriate interfaces. Furthermore, it is appreciated that not all the connections between the components are explicitly shown, and other interfaces between components may be covered within the scope of this disclosure.

In an exemplary aspect, the control system 200 further includes an Autonomous Driving User Machine Interface (ADUMI) 220 that is configured to: automatically determine and monitor the Operational Design Domain (ODD) of the vehicle 100, and generate one or more notifications (e.g. visual and/or auditory notifications) to notify the driver (and/or occupants) of the vehicle 100 based on the determined ODD. In this example, the notification(s) can be presented via the GUI. In an exemplary aspect, the ADUMI 220 may further be configured to generate data and/or control signals to control the ECU 222 and/or other components of the vehicle 100 to directly or indirectly control the movement of the vehicle 100 via mobility system 120.

In an exemplary aspect, the ADUMI 220 is a component of the control system 200 as shown in FIG. 2. In another aspect, the ADUMI 220 is a processor within the one or more processors 102 as shown in FIG. 3. In an exemplary aspect, the ADUMI 220 may be comprised (at least partially or completely) within the ECU 222. In aspects where the ADUMI 220 is partially included in the ECU 222, other functional components of the ADUMI 220 may be included in the control system 200 (including within the processor(s) 102). The ADUMI 220 may include processing circuitry that is configured to execute program instructions to perform the functions of the ADUMI 220 described herein.

In an exemplary aspect, the control system 200 may utilize one or more machine learning models to perform functions of the control system 200, including the execution of the machine learning models by one or more of the processors 214, 216, 218 and/or the ADUMI 220.

In an exemplary aspect, the ADUMI 220 creates or otherwise defines an ODD class 502 (FIG. 5) that associates with (e.g. attaches to) one or more running processes of the vehicle 100 and provides information and/or date of one or more operational states of the vehicle 100. In this example, the ODD class 502 can relay subsystem ODD states of one or more components and/or subsystems of the vehicle 100.

Figure 7:
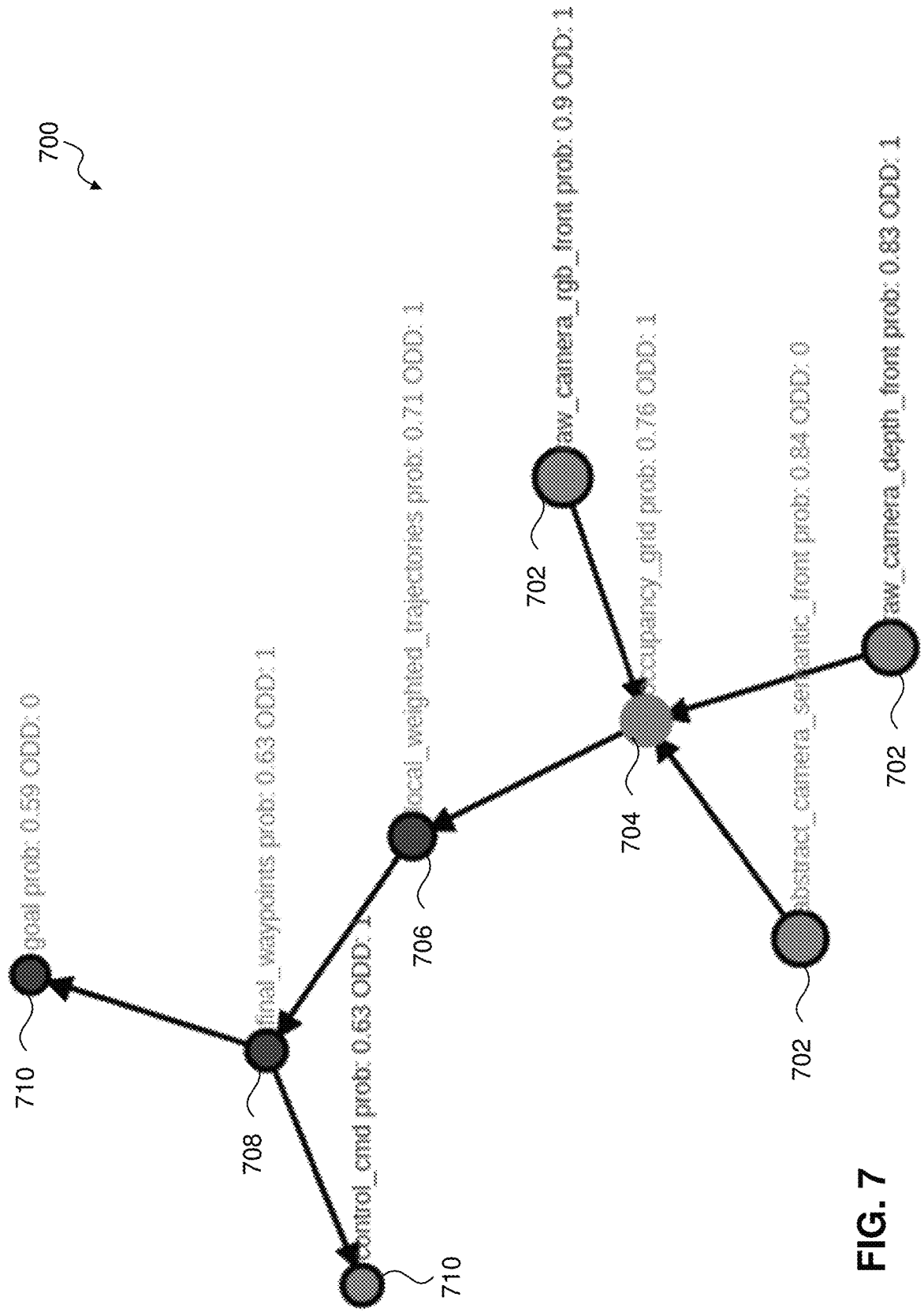
FIG. 7 shows a pipeline view of the ODD nodes in accordance with various aspects of the present disclosure.
Figure 8:
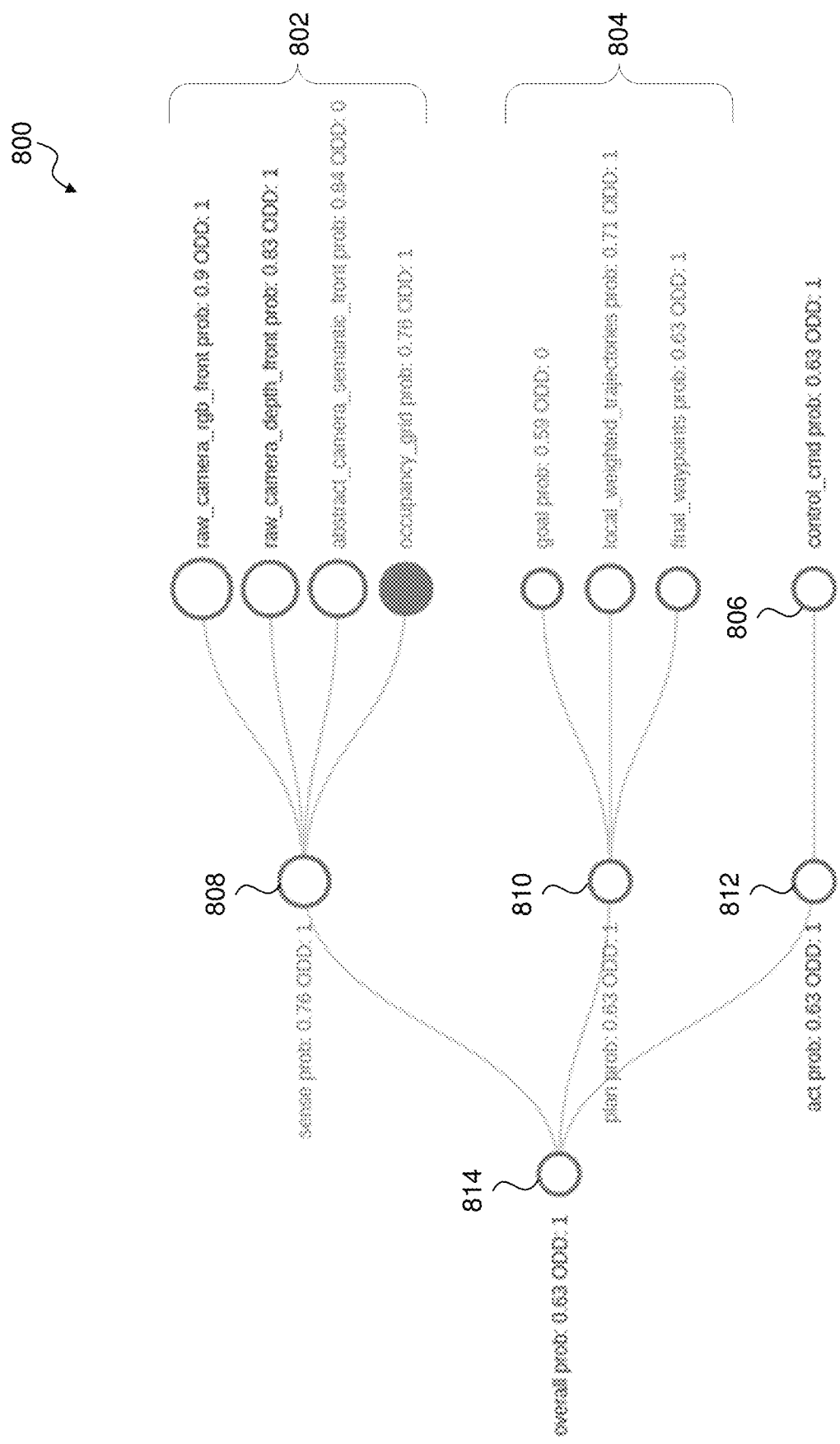
FIG. 8 shows a hierarchy view of the ODD nodes in accordance with various aspects of the present disclosure.

In an exemplary aspect, the ADUMI 220 is further configured to determine inter-system dependencies between one or more components of the vehicle 100, as well as the dependencies between corresponding nodes (e.g. system nodes 702-710, 802-814 of the operating system) associated with the respected components. In this example, the nodes can facilitate a linking together of the data and information generated by the components (e.g. data acquisition devices 112, position devices 114, and/or measurement sensors 116) of the vehicle 100. For example, the measurement sensors 116 can be associated with respective nodes (FIGS. 7 and 8). These nodes can be mapped by the ADUMI 220 to one or more other nodes to thereby provide the control system 200 with the information in an organized arrangement.

In an exemplary aspect, the ADUMI 220 organizes the information into a unified interface, such as a unified application programming interface (API), where the ADUMI 220 can provide the organized information (with real time access) in a hierarchical view (FIG. 8), a pipeline view (FIG. 7), or other view as would be understood by one of ordinary skill in the art. Advantageously, the organized information can be provided to the operator (and/or occupants) of the vehicle 100 via user interface 206 (e.g. graphical user interface 410) to efficiently communicate the capabilities of the control system 200 and the current operational state of the vehicle 100 to increase the transparency of the operational state of the vehicle 100, which may include the operational states of one or more components of the vehicle 100.

In an exemplary aspect, the ADUMI 220 includes one or more application libraries, such as a JavaScript library, C/C++ library, and/or one or more other application libraries as would be understood by one of ordinary skill in the art, whose applications are configured to map information and data gathered and/or generated by components of the vehicle 100, and provide a unified interface (e.g. unified API) to enable real-time bidirectional communication between the control system 200 (e.g. one or more software stacks of the control system 200) and the user (driver and/or other occupants of the vehicle).

In an exemplary aspect, the ADUMI 220 computes system interdependencies and automatically maps nodes 702-710, 802-814 associated with vehicle components to enable real-time updates of system-wide ODD states. These interdependencies and mappings can be illustrated as shown in FIGS. 7 and 8. FIG. 7 shows an example pipeline node graph 700 and FIG. 8 shows an example hierarchical tree 800. As shown in FIG. 7, three nodes 702 are mapped to node 704, which is further mapped to node 706. Node 706 and nodes 710 are then further mapped to node 708. In this example, nodes 702 are associated with image sensors (e.g. cameras of the vehicle 100), whose information and data is mapped to node 704 for further processing. In operation, the ADUMI 220 can determine one or more probability parameters, error parameters, and ODD state information as shown in the ODD class 502 illustrated in FIG. 5, which is described in more detail below.

Figure 5:
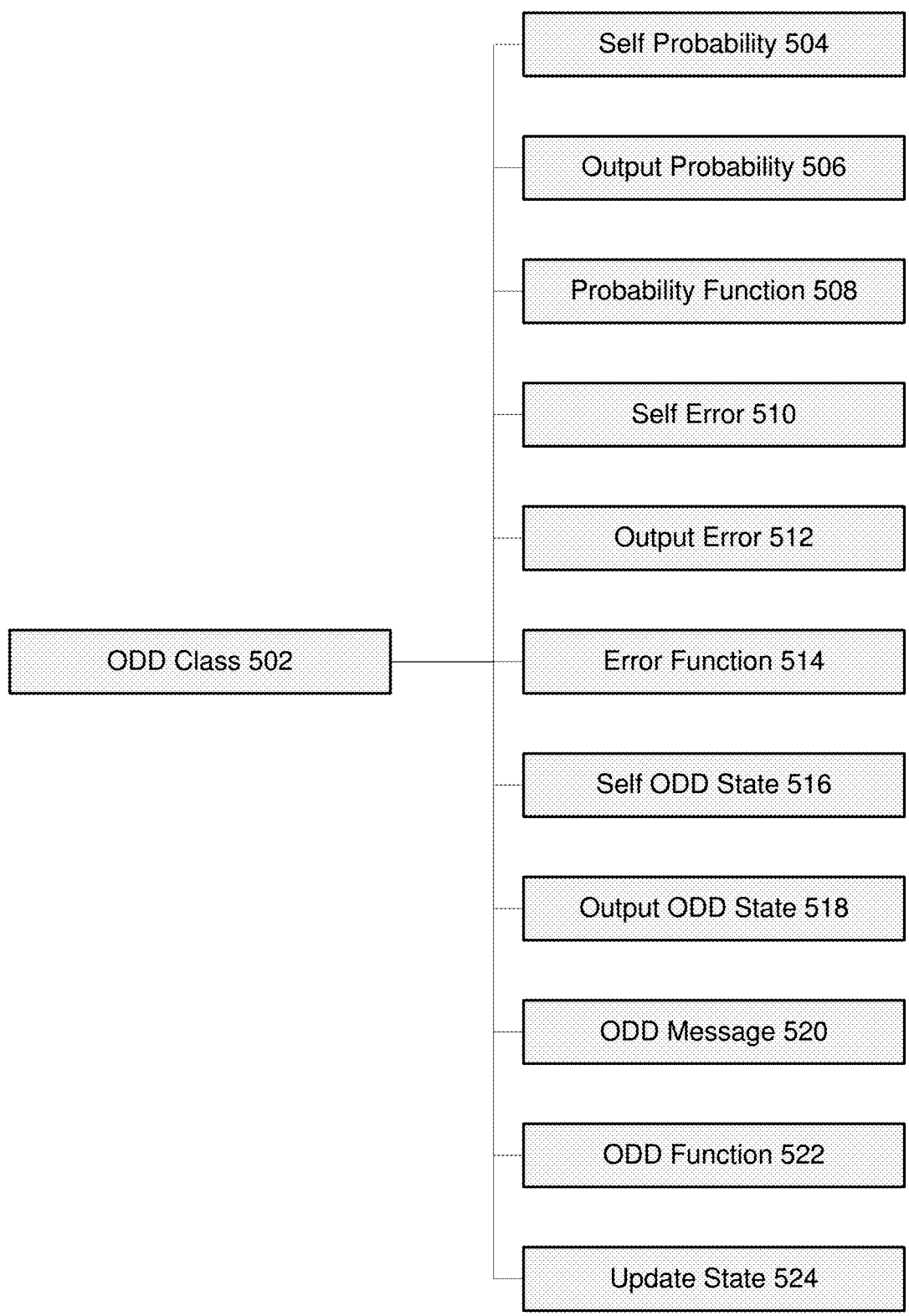
FIG. 5 shows an Operational Design Domain (ODD) class and included parameters of the class in accordance with various aspects of the present disclosure.
Figure 9:
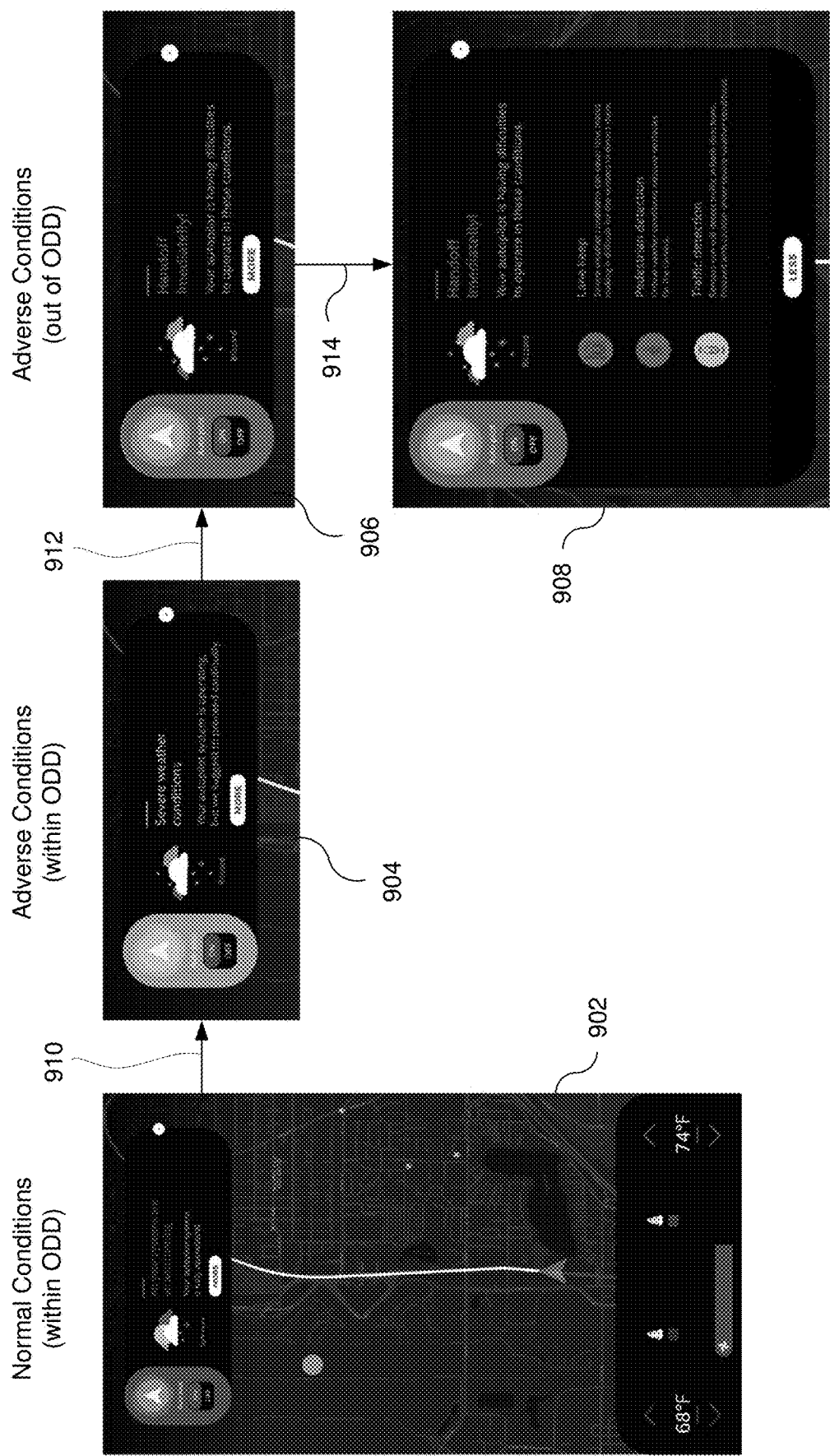
FIG. 9 shows a graphical user interface (GUI) showing the operational states of the vehicle in accordance with various aspects of the present disclosure.
Figure 10:
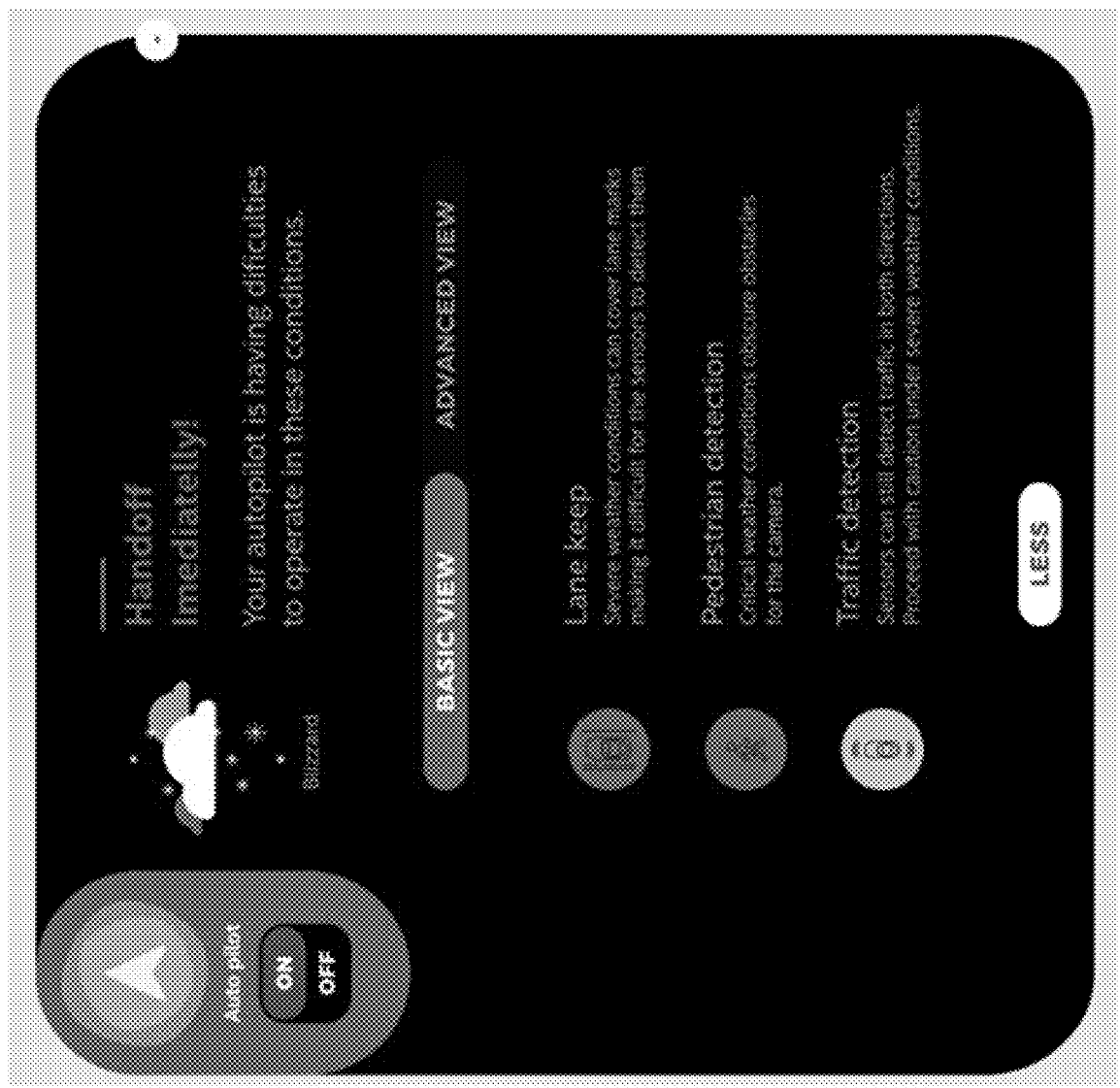
FIG. 10 shows a graphical user interface (GUI) showing the operational state of the vehicle in accordance with various aspects of the present disclosure.
Figure 11:
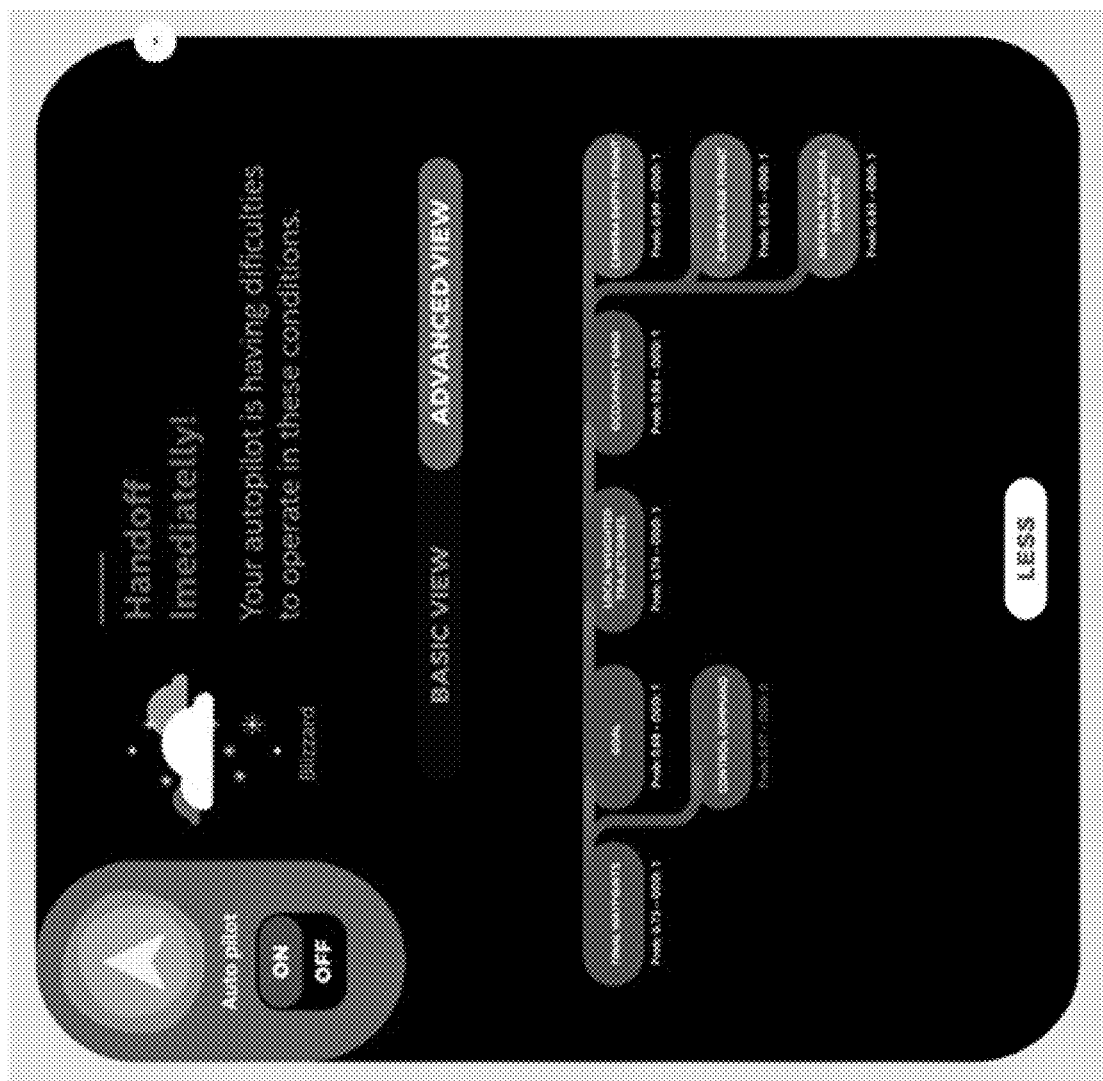
FIG. 11 shows a graphical user interface (GUI) showing the operational state of the vehicle in accordance with various aspects of the present disclosure.

The ADUMI 220 is configured to define an ODD class 502 that provides run-time ODD states. In this aspect, the class is attached to each of the nodes 702-710, 802-814 and creates a system-wide ODD representation, which can be displayed to the driver (and/or other occupants of the vehicle 100). With reference to FIG. 5, in an exemplary aspect, the ODD class 502 includes ODD related states (504, 506, 510, 512, 516, 518, 520, 524) and one or more functions (508, 514, 522) configured to determine the ODD states. The ADUMI 220 can include an ODD class 502 that can aggregate two or more nodes 702-710, 802-814 and the associated data and states under a single ODD. In this example, the ODD class 502 facilitates an organized illustration to the driver (and/or other occupants of the vehicle). The illustrations can include an improved graphical user interface (GUI) that includes the real-time communication of ODD states of the control system 200 to increase transparency of the operational state and statuses of the components of the vehicle 100. Example GUIs are illustrated in FIGS. 9-11.

The ADUMI 220 can be configured to connect or otherwise interface with one or more nodes 702-710, 802-814 (e.g. application components of the software stack in control of the vehicle system 200), and attach an instance of the ODD class 502 to each of the nodes 702-710, 802-814. In this example, each attachment of the ODD instances to the nodes facilitates the ADUMI 220 to aggregate information and data from one or more vehicle components associated with the corresponding nodes 702-710, 802-814, and provide a visualization to the driver (and/or other occupants of the vehicle 100). In this example, the ODD instances are configured as monitoring instances that are configured to monitor the corresponding node attached thereto to monitor the data and/or information provided by the vehicle component associated with the corresponding node. In an exemplary aspect, the nodes 702-710, 802-814 may be running on the same or different processors within the vehicle 100. For example, the vehicle components may be associated with different hardware components within the vehicle 100, where the hardware components may be associate with one or more different processors, or may be associated with the same one or more processor(s). Advantageously, the mapped information and unified interface facilitates/enables the transparency of the control system 200 and its operational status for the operator (and/or occupants) of the vehicle 100, enables real-time determination/calculation of ODD states of the control system 200 and components and sub-components of the vehicle 100, enhances autonomous driving safety (e.g. by pre-emptively informing the user when to take-over control of the vehicle 100, such as when the vehicle 100 is operating outside of the ODD), and builds trust of operator (and/or occupants) by increasing transparency of the operational state and statuses of the vehicle 100.

In an exemplary aspect, the ADUMI 220, based on the mapped information, can generate data and/or control signals to control the ECU and/or other components of the vehicle 100 to directly or indirectly control the movement of the vehicle 100 via mobility system 120.

Figure 4:
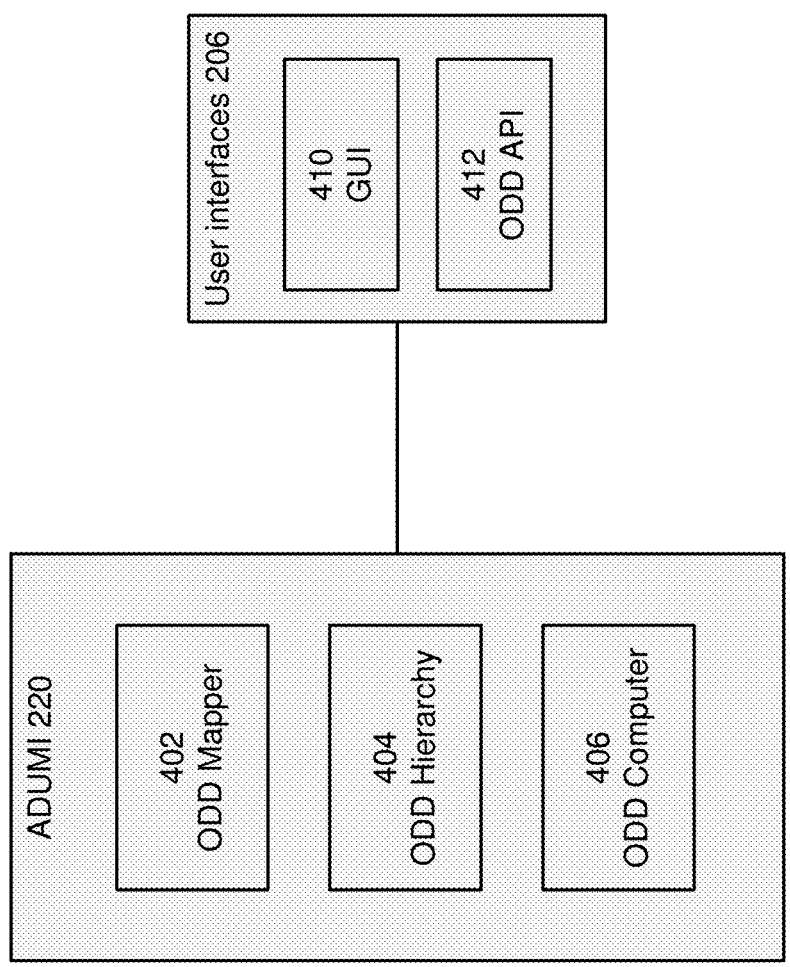
FIG. 4 shows an Autonomous Driving User Machine Interface (ADUMI) of the control system in accordance with various aspects of the present disclosure.

As shown in FIG. 4, the ADUMI 220 includes an ODD mapping processor 402, an ODD hierarchy processor 404, and ODD computation processor 406 in an exemplary aspect. The ODD mapping processor 402 is configured to compute system interdependencies and identify nodes, which are associated with vehicle components, map two or more nodes together, and attach corresponding instances of the ODD to each of the nodes.

The ODD hierarchy processor 404 is configured to illustrate the system interdependencies and node mappings in one or more organized arrangements, such as a hierarchical view, a pipeline view, or other view as would be understood by one of ordinary skill in the art.

The ODD computation processor 406 is configured to determine one or more probability parameters (e.g. trust/confidence probability), error parameters, and ODD state information as shown in the ODD class 502 illustrated in FIG. 5. Based on the determined probability parameters, error parameters and/or ODD state information, the ODD computation processor 406 can determine the operational state and statuses of component(s) of the vehicle 100 or the vehicle 100 itself.

In an exemplary aspect, the ADUMI 220 is coupled to the User interfaces 206, which can include a graphical user interface (GUI) 410 and an ODD application programming interface (API) 412 as shown in FIG. 4. The GUI 410 can illustrate real-time communication of ODD states of the control system 200 to provide the operational state and statuses of the vehicle 100. Exemplary aspects of the GUI 410 are illustrated in FIGS. 9-11.

FIG. 9 shows various operational states of the vehicle 100 and impacts of internal and/or external conditions on the operational status of the vehicle 100. As shown in FIG. 9, GUI 902 shows the vehicle 100 operating in under normal operational conditions and within the scope of the ODD. While operating in an autonomous driving mode and in response to one or more external (e.g. traffic, weather, etc.) and/or internal conditions 910, the vehicle 100 may begin to operate under adverse conditions but within the ODD, as shown in GUI 904. The GUI 902 can include a notification that indicates the operating status of the vehicle 100. In this example, the GUI 902 includes a notification indicating that the vehicle 100 is operating in an autonomous driving (auto pilot) mode, and under normal conditions. As a result of the external and/or internal condition(s) 910, the ADUMI 220 can configured the GUI 410 to include a notification that indicates an adverse condition but still within the scope of the ODD. In this example, the normal indicator is blue in GUI 902, which changes to the color orange in GUI 904 to indicate the change in status. In response to one or more (further) external and/or internal conditions 912, the vehicle 100 may operate under adverse conditions and out of the scope of the ODD, as shown in GUI 906. In this example, the adverse (orange) indicator as in GUI 904 changes color (red) to indicate the out-of-ODD scope operational status. In this example, the GUI 906 can further indicate to the driver that it is recommend that the driver take-over control of the vehicle 100 from control system 200 that is autonomously driving the vehicle 100.

The GUI 410 can further be configured to provide additional information to the driver and/or occupants of the vehicle 100 as shown in GUI 908. The additional information can include, for example, information about one or more components of the vehicle 100 (e.g. data acquisition devices 112, position devices 114, and/or measurement sensors 116), the status of one or more operational functions (e.g. lane keep, adaptive cruise control), one or more sensed/detected conditions (e.g. pedestrian detection, traffic detection), one or more external and/or internal environmental factors (e.g. weather, traffic, health/operational status of one or more automation components) and/or other information as would be understood by one of ordinary skill in the art. In an exemplary aspect, the additional information can be provided in response to a user input 914 to the GUI 410 (e.g. user selection of the "more" button as shown in GUIs 904, 906). The additional information can then be hidden by a further user input (e.g. selection of the "less" button).

FIGS. 10 and 11 illustrate exemplary aspects of the GUI 410, including basic (FIG. 10) and advanced (FIG. 11) views of the GUI 906, 908. In the GUI 410 illustrated in FIG. 10, the GUI shows the vehicle 100 is operating under adverse conditions and out of the scope of the ODD. In this example, the adverse indicator alerts the driver (e.g. red color) and indicates the out-of-ODD scope operational status. In particular, the GUI indicates to the driver that the autonomous driving (autopilot) is having difficulty operating under the current environmental conditions. As shown in FIG. 10, the GUI illustrates a "basic" view that indicates the status of one or more operational functions (e.g. lane keep), one or more sensed/detected conditions (e.g. pedestrian detection, traffic detection), and one or more external and/or internal environmental factors (e.g. weather condition). The basic view can include color indicators to indicate the status and further information as to the degree of impairment of the functions and/or components. For example, "lane keep" indicator and the "pedestrian detection" indicator are provided in red to indicate the significant impairment of these functions due to the severe weather conditions, while the "traffic detection" indicator is provided in yellow to indicate a lesser degree of impairment of the traffic detection function, including notifying that one or more of the sensors used for such detection may be impaired due to the environmental conditions. In this example, the traffic detection function may rely on redundant sensors, so that an impairment of one sensor results in the partial impairment but still operating within the ODD.

FIG. 11 shows an advanced view when the "advanced view" button is selected. The advanced view can show the status of one or more operational functions/status in a tree illustration that can further include probabilities of the corresponding components/nodes of the system.

In an exemplary aspect, the ADUMI 220 (e.g. ODD computation processor 406) is configured to determine one or more respective probability parameters, error parameters and/or ODD state information, as shown in the ODD class 502 illustrated in FIG. 5, for one or more of the nodes (of corresponding components). Based on the determined probability parameters (e.g. self and/or output probabilities), error parameters and/or ODD state information, the ADUMI 220 is configured to determine the operational state and statuses of the vehicle 100 (or one or more components therein), which can then be illustrated to the driver and/or occupants of the vehicle 100 via the GUI 410. In an exemplary aspect, the ADUMI 220 may further be configured to generate data and/or control signals, based on the determined probability parameters, error parameters and/or ODD state information, to control the ECU and/or other components of the vehicle 100 to directly or indirectly control the movement of the vehicle 100 via mobility system 120.

In an exemplary aspect, probability (self and/or output), error (self and/or output), and/or ODD states of a node(s) are computed recursively for the ODD class 502. The probability, error, and/or ODD states can be determined based on its own state/status information and/or such information associated with one or more nodes whose outputs are provided to the node as one or more inputs. In an exemplary aspect, the computation of the probabilities, errors, and states is based on a probability/error/state function. For example, the function can include a logical AND, logical OR, maximum, minimum, average, and/or other mathematical/logic function as would be understood by one of ordinary skill in the art.

Figure 6:
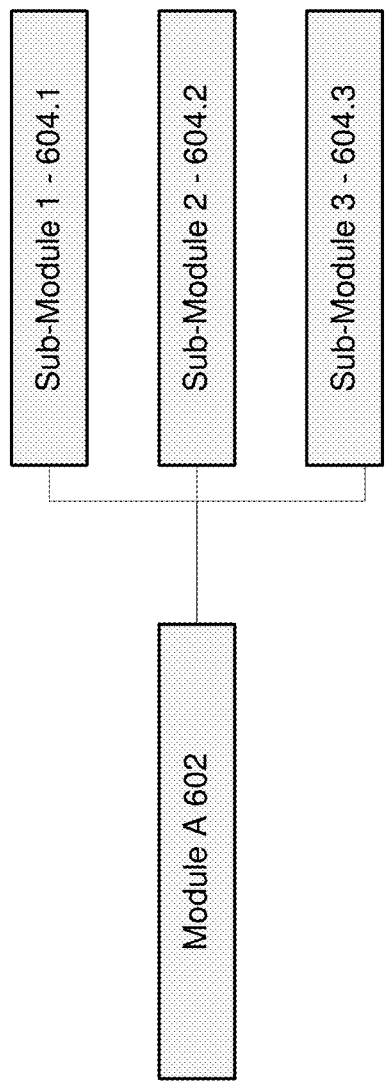
FIG. 6 shows an example module-sub-module interdependency relationship in accordance with various aspects of the present disclosure.

For illustrating the computation of the interdependencies in the ODD between subsystems and components (and corresponding nodes), reference is made to FIG. 6 that illustrates a module A 602 and one or more sub-modules 604.1 to 604.3 with corresponding communication connections. In this example, the module A 602 corresponds to a component and/or functional block of the control system 200, and the sub-module(s) 604 correspond to component(s) and/or functional block(s) having an interdependency therefrom. For example, module 602 may correspond to a perception module of the control system 200, while the sub-modules 604 may correspond to individual components, such as one or more sensors (e.g. object detector from camera, LIDAR, scene segmentation, etc.).

In computing the interdependencies, the ODD class 502 and its parameters (probability (self and/or output), error (self and/or output), and/or ODD states of a node(s)) are computed for each node (which is represented as a module 602 in the illustration of FIG. 6). In an exemplary aspect, the computation of the interdependencies, including computing the ODD class 502 and its parameters (probability (self and/or output), error (self and/or output), and/or ODD states of a node(s)) can be performed recursively.

In an exemplary aspect, ADUMI 220 is configured to determine the self-probability 504 and output probability 506 of each node, where a node is represented in FIG. 6 by module A 602. The determination can be dependent on the respective probability function 508 of the node. In an exemplary aspect, the calculation of the output probability of module 602 is given by:

$$p_A^{out}=p(A=1,\text{inputs}=1)=p(A=1|\text{inputs}=1)\cdot p(\text{inputs}=1) \quad (1)$$

Where $p_A^{out}$ is the output-probability of the module A 602. The output-probability $p_A^{out}$ is the joint trust probability of both the node itself and all its inputs.

In an exemplary aspect, the output probability is a function of the self-probability and the probability of inputs received by the node/module. For example, the output probability $p_A^{out}$ may satisfy the following equation when the input probabilities are cumulative:

$$p_A^{out}=p_A^{self}\cdot\Pi_{i=1,2,3}p_i^{out} \quad (2)$$

Where $p_A^{self}$ is the self-probability of the node (module A), and $p_i^{out}$ is the conditional probability of the given inputs to the current node/module. In this example, the probability function 508 is a summation of all the input probabilities as represented by $\Pi_{i=1,2,3}p_i^{out}$. That is, the output probability 506 is based on the self-probability 504 and each of the corresponding probabilities the inputs to the node/module. The probability function is not limited to a summation, and can include an average or other function as would be understood by one of ordinary skill in the art.

If the particular node is a leaf node, the node does not have any inputs from other nodes, which results in the output probability 506 being equal to the self-probability 504 (i.e., $p_A^{out}=p_A^{self}$). For example, a leaf node can correspond to a sensor (e.g. image sensor) that detects information (receives input) from the environment, which results in the second term ($p_i^{out}$) being set to one. Leaf nodes can also be referred to as ground-truth nodes.

In another aspect where the input probabilities are redundant, output probability $p_A^{out}$ may satisfy the following equation:

$$p_A^{out} = p_A^{self} \cdot \max_{i=1,2,3} p_i^{out} \quad (3)$$

In this example, the node/module A 602 uses only the most trustworthy source from the sub-modules 604.1-604.3. For example, sub-modules 604 may correspond to redundant sensors and only the most trusted input from the sensors is used. Again, the probability function is not limited to a maximum function, and can include another function as would be understood by one of ordinary skill in the art. In an exemplary aspect, the ADUMI 220 is configured define one or more other functions to implement other logic.

In an exemplary aspect, the ADUMI 220 is configured to determine the self-probability 504 and output probability 506 of each node, and propagate the corresponding output probabilities 506 up the hierarchy. In another aspect, the self-probability 504 can be additionally or alternatively propagated. In an exemplary aspect, the ADUMI 220 is configured to recursively determine the self-probability 504 and output probability 506 of each node.

In an exemplary aspect, the ADUMI 220 is configured to determine the self-error 510 and output error 512 of each node. Similar to the self and output probabilities, the self-error 510 ($\varepsilon_A^{self}$) corresponds to the error of the corresponding module/node itself. The output error 512 is based on the self-error 510 and each of the corresponding errors ($\varepsilon_i^{out}$) of the inputs to the node/module. The determination of the errors can be dependent on the respective error function 514 of the node.

In an exemplary aspect, errors can be defined as the root-mean-square error of the input modules and the self-error by assuming linearly additive errors, as provided below:

$$\varepsilon_A^{out} = \sqrt{\varepsilon_A^{self^2} + \sum_{i=1,2,3} \varepsilon_i^{out^2}} \quad (4)$$

Where $\varepsilon_A^{out}$ is the output error of module A 602, $\varepsilon_A^{self}$ is the self-error module A 602 itself introduces, and $\varepsilon_i^{out}$ is the output error of input module i (i.e. the inputs received by module A 602).

In an exemplary aspect, the ADUMI 220 is configured to determine the self-ODD state 516 and output ODD state 518 of each node. The self-ODD state 516 can be defined as a binary (0,1) state corresponding to whether the node (e.g. module A) is operating within the ODD. The output ODD state 518 can be defined as a binary (0,1) state corresponding to whether the node (e.g. module A) and the input nodes (sub-modules 604) are operating within the ODD. In an exemplary aspect, the input states of the input nodes can be processed based on the ODD function 522 similar to the operations of the probability function 508 and error function 514. For example, the ODD function 522 can include a logical AND, logical OR, and/or other mathematical/logic function as would be understood by one of ordinary skill in the art.

The ODD message 520 is configured to generate a message regarding the ODD, including information of the probabilities, errors, and/or states of the ODD class 502.

The Update State 524 is configured to recursively request the input nodes/modules to update their information, and then compute the respective node/module's own state (self-probability, error, or ODD state) based on the updated states of its input nodes/modules. In operation, the updating operations are propagated up the hierarchy from the lead nodes to update the ODD class 502 of each node to update the ODD.

In an exemplary aspect, the output probability, error, and ODD state each has its own update method to compute the respective latest states. A master update method can be provided to update probability, error, and ODD state in the right order with a single call. In an exemplary aspect, the update can be initiated by a user input requesting an update, initiated by the GUI using the API, or by other means as would be understood by one of ordinary skill in the art.

Figure 12:
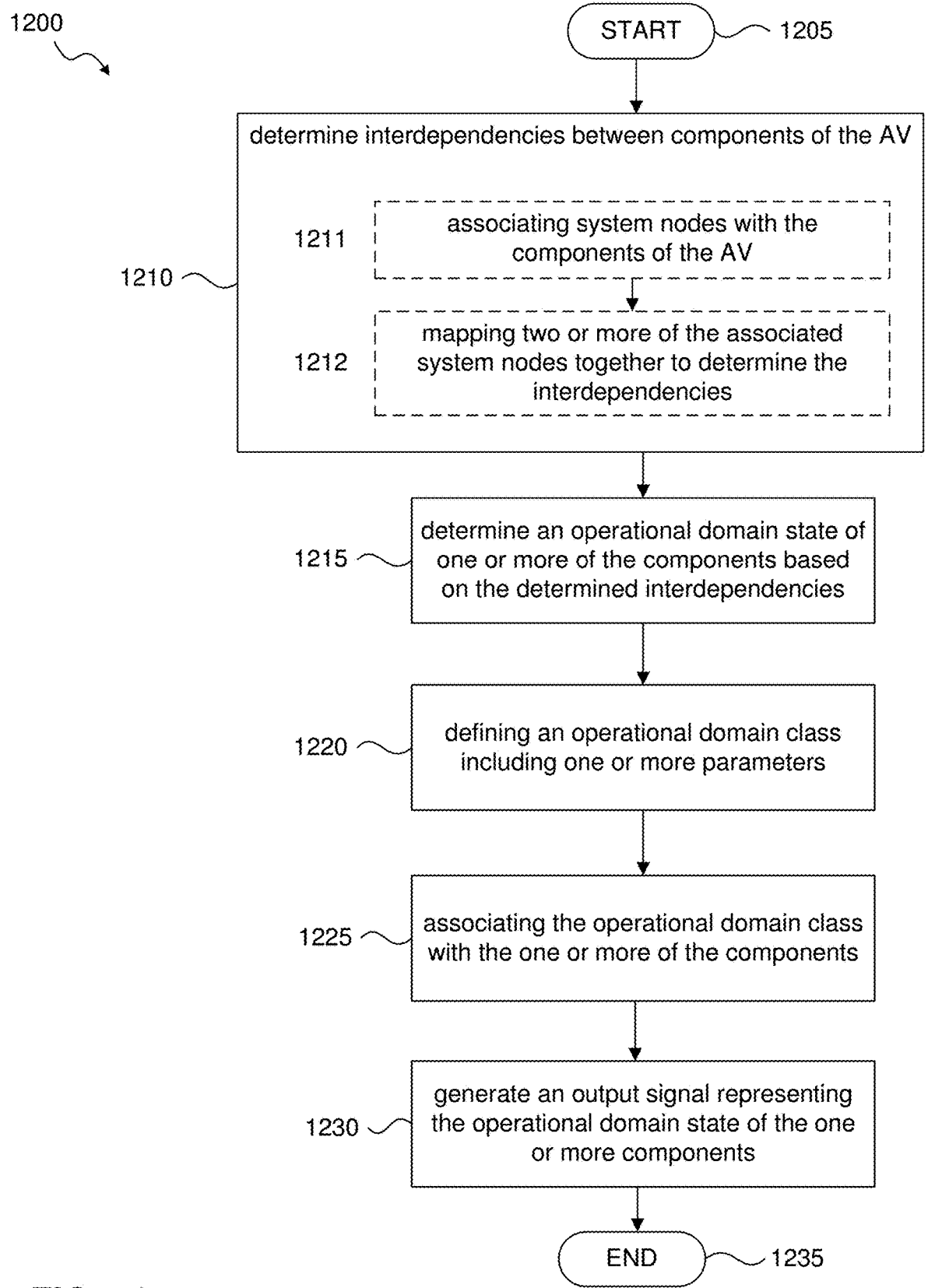
FIG. 12 illustrates a flowchart of a method for monitoring an ODD in accordance with an aspect of the disclosure.

FIG. 12 illustrates an ODD monitoring method 1200 according to an exemplary aspect of the present disclosure. The flowchart 1200 is described with continued reference to FIGS. 1-11. The operations of the method are not limited to the order described below, and the various operations may be performed in a different order. Further, two or more operations of the methods may be performed simultaneously with each other.

The flowchart 1200 begins with operations 1205 and transitions to operation 1210, where interdependencies between components of the AV are determined. In an exemplary aspect, the operation 1210 includes the following sub-operations: associating system nodes with the components of the AV (operation 1211), and mapping two or more of the associated system nodes together to determine the interdependencies (operation 1212).

After operation 1210, the flowchart 1200 transitions to operation 1215, where an operational domain state of one or more of the components is determined based on the determined interdependencies.

After operation 1215, the flowchart 1200 transitions to operation 1220, where an operational domain class is defined. The class can include one or more parameters.

After operation 1220, the flowchart 1200 transitions to operation 1225, where the operational domain class is associated with the one or more of the components.

After operation 1225, the flowchart 1200 transitions to operation 1225, an output signal is generated that represents the operational domain state of the one or more components.

After operation 1230, the flowchart transitions to operation 1235 where the flowchart ends. The flowchart may be repeated according to exemplary aspects.

EXAMPLES

The following examples pertain to further aspects.

Example 1 is a system for monitoring an operational domain in an automated vehicle (AV), the system comprising: a memory having instructions stored thereon; and one or more processors configured to execute the stored instructions to: determine interdependencies between components of the AV; determine an operational domain state of one or more of the components based on the determined interdependencies; and generate an output signal representing the operational domain state of the one or more components.

Example 2 is the system of Example 1, further comprising a user interface configured to present a notification corresponding to the determined operational domain state of the one or more components.

Example 3 is the system of any of Examples 1-2, wherein the one or more processors are configured to provide the output signal to a mobility system of the AV to control the mobility system.

Example 4 is the system of any of Examples 1-3, wherein the determination of the interdependencies between the components comprises: associating system nodes with the components of the AV; and mapping two or more of the associated system nodes together to determine the interdependencies.

Example 5 is the system of any of Examples 1-4, wherein the one or more processors are further configured to define an operational domain class including one or more parameters; associate the operational domain class with the one or more of the components, wherein the determination of the operational domain state is based on the operational domain class and the determined interdependencies.

Example 6 is the system of Example 5, wherein the one or more parameters comprise: probability parameters of output data associated with the one or more components, error parameters of the output data, and state parameters corresponding to an operating compliance of the one or more components with respect to the operational domain.

Example 7 is the system of Example 6, wherein the probability parameters include a self-probability value associated with the one or more components and one or more input probability values associated with one or more other components of the components of the AV having an interdependency with the one or more components.

Example 8 is the system of Example 6, wherein the error parameters include a self-error value associated with the one or more components and one or more input error values associated with one or more other components of the components of the AV having an interdependency with the one or more components.

Example 9 is the system of Example 6, wherein the one or more parameters comprise at least one of: a function value defining a functional relationship of the probability parameters, a function value defining a functional relationship of the error parameters, and a function value defining a functional relationship of the state parameters.

Example 10 is the system of Example 6, wherein: (1) the probability parameters include a self-probability value associated with the one or more components and one or more input probability values associated with one or more other components of the components of the AV having an interdependency with the one or more components; and/or (2) the error parameters include a self-error value associated with the one or more components and one or more input error values associated with one or more other components of the components of the AV having an interdependency with the one or more components; and/or (3) the one or more parameters comprise: a function value defining a functional relationship of the probability parameters, a function value defining a functional relationship of the error parameters, and/or a function value defining a functional relationship of the state parameters.

Example 11 is the system of Example 6, wherein: (1) the probability parameters include a self-probability value associated with the one or more components and one or more input probability values associated with one or more other components of the components of the AV having an interdependency with the one or more components; (2) the error parameters include a self-error value associated with the one or more components and one or more input error values associated with one or more other components of the components of the AV having an interdependency with the one or more components; and (3) the one or more parameters further comprise: a function value defining a functional relationship of the probability parameters, a function value defining a functional relationship of the error parameters, and a function value defining a functional relationship of the state parameters.

Example 12 is the system of any of Examples 1-11, wherein the one or more processors are further configured to determine hierarchies between components of the AV, the operational domain state being determined based on the determined interdependencies and the hierarchies.

Example 13 is an automated vehicle (AV) having an operational domain, the AV comprising: control system components; and one or more processors configured to: determine interdependencies between the control system components; determine an operational domain state of one or more of the control system components based on the determined interdependencies; and generate an output signal representing the operational domain state of the one or more control system components.

Example 14 is the AV of Examples 13, further comprising a user interface configured to present a notification corresponding to the determined operational domain state of the one or more control system components.

Example 15 is the AV of any of Examples 13-14, further comprising a mobility system, wherein the one or more processors is configured to provide the output signal to the mobility system to control the mobility system.

Example 16 is the AV of any of Examples 13-15, wherein the determination of the interdependencies between the control system components comprises: associating system nodes with the control system components; and mapping two or more of the associated system nodes together to determine the interdependencies.

Example 17 is the AV of any of Examples 13-16, wherein the one or more processors are further configured to: define an operational domain class including one or more parameters; associate the operational domain class with the one or more of the control system components, wherein the determination of the operational domain state is based on the operational domain class and the determined interdependencies.

Example 18 is the AV of any of Examples 13-17, wherein the one or more parameters comprise: probability parameters of output data associated with the one or more control system components, error parameters of the output data, and state parameters corresponding to an operating compliance of the one or more control system components with respect to the operational domain.

Example 19 is the AV of Example 18, wherein the probability parameters include a self-probability value associated with the one or more control system components and one or more input probability values associated with one or more other control system components of the control system components having an interdependency with the one or more control system components.

Example 20 is the AV of Example 18, wherein the error parameters include a self-error value associated with the one or more control system components and one or more input error values associated with one or more other control system components of the control system components having an interdependency with the one or more control system components.

Example 21 is the AV of Example 18, wherein the one or more parameters further comprise at least one of: a function value defining a functional relationship of the probability parameters, a function value defining a functional relationship of the error parameters, and a function value defining a functional relationship of the state parameters.

Example 22 is the AV of Example 18, wherein the one or more parameters further comprise: a function value defining a functional relationship of the probability parameters, a function value defining a functional relationship of the error parameters, and a function value defining a functional relationship of the state parameters.

Example 23 is the AV of Example 18, wherein: (1) the probability parameters include a self-probability value associated with the one or more control system components and one or more input probability values associated with one or more other control system components of the control system components having an interdependency with the one or more control system components; and/or (2) the error parameters include a self-error value associated with the one or more control system components and one or more input error values associated with one or more other control system components of the control system components having an interdependency with the one or more control system components; and/or (3) the one or more parameters further comprise: a function value defining a functional relationship of the probability parameters, a function value defining a functional relationship of the error parameters, and/or a function value defining a functional relationship of the state parameters.

Example 24 is the AV of Example 18, wherein: (1) the probability parameters include a self-probability value associated with the one or more control system components and one or more input probability values associated with one or more other control system components of the control system components having an interdependency with the one or more control system components; (2) the error parameters include a self-error value associated with the one or more control system components and one or more input error values associated with one or more other control system components of the control system components having an interdependency with the one or more control system components; and (3) the one or more parameters further comprise: a function value defining a functional relationship of the probability parameters, a function value defining a functional relationship of the error parameters, and a function value defining a functional relationship of the state parameters.

Example 25 is a non-transitory computer-readable medium having instructions stored thereon that, when executed by one or more processors, cause the one or more processors to: determine interdependencies between components of an automated vehicle (AV); determine an operational domain state of one or more of the components based on the determined interdependencies; and generate an output signal representing the operational domain state of the one or more components.

Example 26 is the medium of Example 25, wherein the one or more processors are further configured to: define an operational domain class including one or more parameters; and associate the operational domain class with the one or more of the components, wherein the determination of the operational domain state is based on the operational domain class and the determined interdependencies.

Example 27 is the medium of any of Examples 25-26, wherein the one or more parameters comprise: probability parameters of output data associated with the one or more components, error parameters of the output data, and state parameters corresponding to an operating compliance of the one or more components with respect to the operational domain, wherein the probability parameters include a self-probability value associated with the one or more components and one or more input probability values associated with one or more other components of the components of the AV having an interdependency with the one or more components, and wherein the error parameters include a self-error value associated with the one or more components and one or more input error values associated with one or more other components of the components of the AV having an interdependency with the one or more components.

Example 28 is the medium of Example 27, wherein the one or more parameters further comprise at least one of: a function value defining a functional relationship of the probability parameters, a function value defining a functional relationship of the error parameters, and a function value defining a functional relationship of the state parameters.

Example 29 is the medium of Example 27, wherein the one or more parameters further comprise: a function value defining a functional relationship of the probability parameters, a function value defining a functional relationship of the error parameters, and a function value defining a functional relationship of the state parameters.

Example 30 is the medium of any of Examples 25-29, wherein one or more processors are further configured to determine hierarchies between components of the AV, the operational domain state being determined based on the determined interdependencies and the hierarchies.

Example 31 is the medium of any of Examples 25-30, wherein the one or more processors are further configured to provide the output signal to a user interface of the AV to present a notification corresponding to the determined operational domain state of the one or more components.

Example 32 is the medium of any of Examples 25-30, wherein the one or more processors are further configured to provide the output signal to a mobility system of the AV to control the mobility system.

Example 33 is a system for monitoring an operational domain in an automated vehicle (AV), the system comprising: memory storage means for storing instructions; and processing means for executing the stored instructions to: determine interdependencies between components of the AV; determine an operational domain state of one or more of the components based on the determined interdependencies; and generate an output signal representing the operational domain state of the one or more components.

Example 34 is the system of Example 33, further comprising user interface means for presenting a notification corresponding to the determined operational domain state of the one or more components.

Example 35 is the system of any of Examples 33-34, wherein the processing means provide the output signal to a mobility system of the AV to control the mobility system.

Example 36 is the system of any of Examples 33-35, wherein the determination of the interdependencies between the components comprises: associating system nodes with the components of the AV; and mapping two or more of the associated system nodes together to determine the interdependencies.

Example 37 is the system of any of Examples 33-36, wherein the processing means define an operational domain class including one or more parameters; associate the operational domain class with the one or more of the components, wherein the determination of the operational domain state is based on the operational domain class and the determined interdependencies.

Example 38 is the system of Example 37, wherein the one or more parameters comprise: probability parameters of output data associated with the one or more components, error parameters of the output data, and state parameters corresponding to an operating compliance of the one or more components with respect to the operational domain.

Example 39 is the system of Example 38, wherein the probability parameters include a self-probability value associated with the one or more components and one or more input probability values associated with one or more other components of the components of the AV having an interdependency with the one or more components.

Example 40 is the system of Example 38, wherein the error parameters include a self-error value associated with the one or more components and one or more input error values associated with one or more other components of the components of the AV having an interdependency with the one or more components.

Example 41 is the system of Example 38, wherein the one or more parameters comprise at least one of: a function value defining a functional relationship of the probability parameters, a function value defining a functional relationship of the error parameters, and a function value defining a functional relationship of the state parameters.

Example 42 is the system of Example 38, wherein: (1) the probability parameters include a self-probability value associated with the one or more components and one or more input probability values associated with one or more other components of the components of the AV having an interdependency with the one or more components; and/or (2) the error parameters include a self-error value associated with the one or more components and one or more input error values associated with one or more other components of the components of the AV having an interdependency with the one or more components; and/or (3) the one or more parameters comprise: a function value defining a functional relationship of the probability parameters, a function value defining a functional relationship of the error parameters, and/or a function value defining a functional relationship of the state parameters.

Example 43 is the system of Example 38, wherein: (1) the probability parameters include a self-probability value associated with the one or more components and one or more input probability values associated with one or more other components of the components of the AV having an interdependency with the one or more components; (2) the error parameters include a self-error value associated with the one or more components and one or more input error values associated with one or more other components of the components of the AV having an interdependency with the one or more components; and (3) the one or more parameters further comprise: a function value defining a functional relationship of the probability parameters, a function value defining a functional relationship of the error parameters, and a function value defining a functional relationship of the state parameters.

Example 44 is the system of any of Examples 33-43, wherein the processing means determine hierarchies between components of the AV, the operational domain state being determined based on the determined interdependencies and the hierarchies.

Example 45 is an automated vehicle (AV) having an operational domain, the AV comprising: control system means; and processing means for: determining interdependencies between the control system components; determining an operational domain state of one or more of the control system components based on the determined interdependencies; and generating an output signal representing the operational domain state of the control system means.

Example 46 is the AV of Examples 45, further comprising a user interface configured to present a notification corresponding to the determined operational domain state of the one or more control system means.

Example 47 is the AV of any of Examples 45-46, further comprising a mobility system, wherein the one or more processors is configured to provide the output signal to the mobility system to control the mobility system.

Example 48 is the AV of any of Examples 45-47, wherein the determination of the interdependencies between the control system means comprises: associating system nodes with the control system means; and mapping two or more of the associated system nodes together to determine the interdependencies.

Example 49 is the AV of any of Examples 45-48, wherein the one or more processors are further configured to: define an operational domain class including one or more parameters; associate the operational domain class with control system means, wherein the determination of the operational domain state is based on the operational domain class and the determined interdependencies.

Example 50 is the AV of any of Examples 45-49, wherein the one or more parameters comprise: probability parameters of output data associated with the control system means, error parameters of the output data, and state parameters corresponding to an operating compliance of the control system means with respect to the operational domain.

Example 51 is the AV of Example 50, wherein the probability parameters include a self-probability value associated with the control system means and one or more input probability values associated with other control system components of the control system means having an interdependency with the control system means.

Example 52 is the AV of Example 50, wherein the error parameters include a self-error value associated with the control system means and one or more input error values associated with one or more other control system components of the control system means having an interdependency with the one or more control system means.

Example 53 is the AV of Example 50, wherein the one or more parameters further comprise at least one of: a function value defining a functional relationship of the probability parameters, a function value defining a functional relationship of the error parameters, and a function value defining a functional relationship of the state parameters.

Example 54 is the AV of Example 50, wherein the one or more parameters further comprise: a function value defining a functional relationship of the probability parameters, a function value defining a functional relationship of the error parameters, and a function value defining a functional relationship of the state parameters.

Example 55 is the AV of Example 50, wherein: (1) the probability parameters include a self-probability value associated with the control system means and one or more input probability values associated with one or more other control system components of the control system means having an interdependency with the control system means; and/or (2) the error parameters include a self-error value associated with the control system means and one or more input error values associated with one or more other control system components of the control system means having an interdependency with the control system means; and/or (3) the one or more parameters further comprise: a function value defining a functional relationship of the probability parameters, a function value defining a functional relationship of the error parameters, and/or a function value defining a functional relationship of the state parameters.

Example 56 is the AV of Example 50, wherein: (1) the probability parameters include a self-probability value associated with the control system means and one or more input probability values associated with one or more other control system components of the control system means having an interdependency with the control system means; (2) the error parameters include a self-error value associated with the control system means and one or more input error values associated with one or more other control system components of the control system means having an interdependency with the control system means; and (3) the one or more parameters further comprise: a function value defining a functional relationship of the probability parameters, a function value defining a functional relationship of the error parameters, and a function value defining a functional relationship of the state parameters.

Example 57 is an apparatus as shown and described.

Example 58 is a method as shown and described.

Example 59 is a non-transitory computer-readable storage medium with an executable computer program stored thereon, the program instructing a processor to perform the method as shown and described.

Example 60 is a computer program product having a computer program which is directly loadable into a memory of a controller, when executed by the controller, causes the controller to perform the method as shown and described.

CONCLUSION

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," "processor circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, as described herein, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others. A processor or a controller can be "hard-coded" with instructions to perform corresponding function(s) according to aspects described herein. Alternatively, the processor or controller can access an internal and/or external memory to retrieve instructions stored in the memory, which when executed by the processor/controller, perform the corresponding function (s) associated with the processor/controller, and/or one or more functions and/or operations related to the operation of a component having the processor/controller included therein.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven or drivable object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

A "ground vehicle" may be understood to include any type of vehicle, as described above, which is configured to traverse or be driven on the ground, e.g., on a street, on a road, on a track, on one or more rails, off-road, etc. An "aerial vehicle" may be understood to be any type of vehicle, as described above, which is capable of being maneuvered above the ground for any duration of time, e.g., a drone. Similar to a ground vehicle having wheels, belts, etc., for providing mobility on terrain, an "aerial vehicle" may have one or more propellers, wings, fans, among others, for providing the ability to maneuver in the air. An "aquatic vehicle" may be understood to be any type of vehicle, as described above, which is capable of being maneuvers on or below the surface of liquid, e.g., a boat on the surface of water or a submarine below the surface. It is appreciated that some vehicles may be configured to operate as one of more of a ground, an aerial, and/or an aquatic vehicle.

The term "autonomous vehicle" may describe a vehicle capable of implementing at least one navigational change without driver input, including a vehicle that implements all or substantially all navigational changes, at least during some (significant) part (spatial or temporal, e.g., in certain areas, or when ambient conditions are fair, or on highways, or above or below a certain speed) of some drives. An "autonomous vehicle" may be distinguished from a "partially autonomous vehicle" or a "semi-autonomous vehicle" that is capable of implementing some (but not all) navigational changes, possibly at certain times, under certain conditions, or in certain areas.

A navigational change may describe or include a change in one or more of steering, braking, or acceleration/deceleration of the vehicle. A vehicle may be described as autonomous even in case the vehicle is not fully automatic (e.g., fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

In the context of the present disclosure, "vehicle operation data" may be understood to describe any type of feature related to the operation of a vehicle. By way of example, "vehicle operation data" may describe the status of the vehicle such as the type of propulsion unit(s), types of tires or propellers of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time varying features or data).

Various aspects herein may utilize one or more machine learning models to perform corresponding functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may then be used during an inference phase to make predictions or decisions based on input data.

The machine learning models described herein may take any suitable form or utilize any suitable techniques. For example, any of the machine learning models may utilize supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

Reinforcement learning models may be given positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values. References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

As described herein, the following terms may be used as synonyms: driving parameter set, driving model parameter set, safety layer parameter set, driver assistance, automated driving model parameter set, and/or the like (e.g., driving safety parameter set). These terms may correspond to groups of values used to implement one or more models for directing a vehicle to operate according to the manners described herein. Furthermore, throughout the present disclosure, the following terms may be used as synonyms: driving parameter, driving model parameter, safety layer parameter, driver assistance and/or automated driving model parameter, and/or the like (e.g., driving safety parameter), and may correspond to specific values within the previously described sets.

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

What is claimed is:

1. A system for monitoring an operational domain in an automated vehicle (AV), the system comprising:
a memory configured to store instructions; and
one or more processors configured to execute the stored instructions to:
determine interdependencies between control system components of the AV;
define an operational domain class including one or more parameters, wherein the one or more parameters are recursively updated and include at least (i) a self-probability value of one or more of the control system components, and (ii) one or more input probability values, which are determined based on the determined interdependencies of one or more other of the control system components having an interdependency with the one or more control system components,
wherein the self-probability value of the one or more of the control system components of the AV is determined in accordance with a respective probability function identified with each respective one of the one or more control system components of the AV, and is indicative of a probability of each respective one of the one or more control system components of the AV computing a correct output in accordance with a respective function;
associate the operational domain class with the one or more of the control system components;
determine an operational domain state of the one or more control system components based at least on the determined self-probability value of the one or more control system components, the one or more input probability values of the one or more other control system components, and the determined interdependencies; and
provide an output signal representing the operational domain state of the one or more control system components to a mobility system of the AV to control the mobility system.

2. The system of claim 1, further comprising a graphical user interface configured to present a notification corresponding to the determined operational domain state of the one or more control system components of the AV.

3. The system of claim 2, wherein the user interface configured to present, in a first view, the notification corresponding to the determined operational domain state of the one or more control system components of the AV, and to present, in a second view, the self-probability value of the one or more of the control system components of the AV.

4. The system of claim 1, wherein the determination of the interdependencies between the control system components comprises:
associating system nodes with the control system components of the AV; and
mapping two or more of the associated system nodes together to determine the interdependencies.

5. The system of claim 1, wherein the one or more parameters further comprise: probability parameters of output data associated with the one or more control system components, error parameters of the output data, and state parameters corresponding to an operating compliance of the one or more control system components with respect to the operational domain.

6. The system of claim 5, wherein the error parameters include a self-error value associated with the one or more control system components and one or more input error values associated with the one or more other control system components having an interdependency with the one or more control system components.

7. The system of claim 6, wherein the self-error value associated with the one or more control system components of the AV and the one or more input error values associated with the one or more other control system components of the AV are distinct from the self-probability value of one or more of the control system components of the AV.

8. The system of claim 5, wherein the one or more parameters further comprise: a function value defining a functional relationship of the probability parameters, a function value defining a functional relationship of the error parameters, and/or a function value defining a functional relationship of the state parameters.

9. The system of claim 1, wherein the one or more processors are further configured to determine hierarchies between the control system components of the AV, the operational domain state being determined based on the determined interdependencies and the hierarchies.

10. The system of claim 1, wherein the one or more processors are further configured to determine a joint trust probability based on the self-probability value and the one or more input probability values, wherein the operational domain state of the one or more control system components is determined based on the joint trust probability.

11. The system of claim 1, wherein the one or more input probability values of the one or more other control system components is based on the self-probability value of the one or more other control system components and an input probability associated with at least one other control system component having an interdependency with the one or more other control system components.

12. An automated vehicle (AV) having an operational domain, the AV comprising:
a mobility system configured control movement of the AV;
control system components; and
one or more processors configured to:
determine interdependencies between the control system components;
define an operational domain class including one or more parameters, wherein the one or more parameters are recursively updated and include at least (i) a self-probability value of one or more of the control system components, and (ii) one or more input probability values, which are determined based on the determined interdependencies of one or more other of the control system components having an interdependency with the one or more control system components,
wherein the self-probability value of one or more of the control system components of the AV is determined in accordance with a respective probability function identified with each respective one of the one or more control system components of the AV, and is indicative of a probability of each respective one of the one or more control system components of the AV computing a correct output in accordance with a respective function;
associate the operational domain class with the one or more of the control system components;
determine an operational domain state of the one or more control system components based at least on the determined self-probability value of the one or more control system components, the one or more input probability values of the one or more other control system components, and the determined interdependencies; and provide an output signal representing the operational domain state of the control system components to the mobility system to control the mobility system.

13. The AV of claim 12, further comprising:
a graphical user interface configured to present a notification corresponding to the determined operational domain state of the control system components.

14. The AV of claim 12, wherein the determination of the interdependencies between the control system components comprises:
associating system nodes with the control system components; and
mapping two or more of the associated system nodes together to determine the interdependencies.

15. The AV of claim 12, wherein the one or more parameters further comprise: probability parameters of output data associated with the one or more of the control system components, error parameters of the output data, and state parameters corresponding to an operating compliance of the one or more of the control system components with respect to the operational domain.

16. The AV of claim 15, wherein the error parameters include a self-error value associated with the one or more control system components and one or more input error values associated with the one or more other control system components having an interdependency with the one or more control system components.

17. The AV of claim 15, wherein the one or more parameters further comprise: a function value defining a functional relationship of the probability parameters, a function value defining a functional relationship of the error parameters, and/or a function value defining a functional relationship of the state parameters.

18. A non-transitory computer-readable medium having instructions stored thereon that, when executed by one or more processors, cause the one or more processors to:
determine interdependencies between control system components of an automated vehicle (AV);
define an operational domain class including one or more parameters, wherein the one or more parameters are recursively updated and include at least (i) a self-probability value of one or more of the control system components, and (ii) one or more input probability values, which are determined based on the determined interdependencies of one or more other of the control system components having an interdependency with the one or more control system components,
wherein the self-probability value of one or more of the control system components of the AV is determined in accordance with a respective probability function identified with each respective one of the one or more control system components of the AV, and is indicative of a probability of each respective one of the one or more control system components of the AV computing a correct output in accordance with a respective function;
associate the operational domain class with the one or more of the control system components;
determine an operational domain state of the one or more control system components based at least on the determined self-probability value of the one or more control system components, the one or more input probability values of the one or more other control system components, and the determined interdependencies; and
provide an output signal representing the operational domain state of the one or more control system components to a mobility system of the AV to control the mobility system.

19. The medium of claim 18, wherein the one or more parameters further comprise: probability parameters of output data associated with the one or more control system components, error parameters of the output data, and state parameters corresponding to an operating compliance of the one or more control system components with respect to the operational domain.

20. The medium of claim 19, wherein the one or more parameters further comprise: a function value defining a functional relationship of the probability parameters, a function value defining a functional relationship of the error parameters, and/or a function value defining a functional relationship of the state parameters.

21. The medium of claim 18, wherein one or more processors are further configured to determine hierarchies between the control system components of the AV, the operational domain state being determined based on the determined interdependencies and the hierarchies.

22. The medium of claim 18, wherein the one or more processors are further configured to provide the output signal to a graphical user interface of the AV to present a notification corresponding to the determined operational domain state of the one or more control system components.

* * * * *